(12) United States Patent
Bhushan et al.

(10) Patent No.: US 10,342,043 B2
(45) Date of Patent: *Jul. 2, 2019

(54) COUPLING UPLINK AND DOWNLINK CCA IN LTE-U

(71) Applicant: QUALCOMM Incorporated, San Diego, CA (US)

(72) Inventors: Naga Bhushan, San Diego, CA (US); Aleksandar Damnjanovic, Del Mar, CA (US); Tingfang Ji, San Diego, CA (US); Peter Gaal, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,071

(22) Filed: Mar. 26, 2018

(65) Prior Publication Data

US 2018/0220451 A1 Aug. 2, 2018

Related U.S. Application Data

(63) Continuation of application No. 14/480,553, filed on Sep. 8, 2014, now Pat. No. 9,949,292.
(Continued)

(51) Int. Cl.
*H04L 5/00* (2006.01)
*H04W 36/22* (2009.01)
*H04W 74/08* (2009.01)

(52) U.S. Cl.
CPC .......... *H04W 74/08* (2013.01); *H04L 5/0091* (2013.01); *H04W 36/22* (2013.01); *H04W 74/0808* (2013.01)

(58) Field of Classification Search
CPC ............... H04W 74/085; H04W 84/12; H04W 72/1226; H04W 72/1278; H04W 52/04;
(Continued)

(56) References Cited

U.S. PATENT DOCUMENTS 7,623,448 B1 11/2009 Vrzic et al.
8,774,209 B2 7/2014 Sadek et al.
(Continued)

FOREIGN PATENT DOCUMENTS

CN 101204043 A 6/2008
JP 2011254319 A 12/2011
(Continued)

OTHER PUBLICATIONS

ISA/EPO, International Search Report and Written Opinion of the International Searching Authority, Int'l. App. No. PCT/US2014/054646, dated Dec. 11, 2014, European Patent Office, Rijswijk, NL 11 pgs.

*Primary Examiner* — Alpus Hsu
*Assistant Examiner* — Camquyen Thai
(74) *Attorney, Agent, or Firm* — Liem T. Do

(57) ABSTRACT

Methods, systems, and devices are described contention-based channel access procedures that may enhance efficiency in communications using unlicensed spectrum. A time period may be identified during which base stations perform contention-based downlink channel access procedures for access to a channel in an unlicensed spectrum. The base stations may be coordinated such that different base stations may seek channel access during different time intervals during the time period. Contention-based uplink channel access procedures for UEs may then be modified to favor one or more UEs that are associated with a base station that has won channel access.

19 Claims, 18 Drawing Sheets

Related U.S. Application Data

(60) Provisional application No. 61/876,655, filed on Sep. 11, 2013.

(58) Field of Classification Search
CPC ..... H04W 24/00; H04W 72/02; H04W 28/26; H04L 12/4013; H04L 12/1417
See application file for complete search history.

(56) References Cited

U.S. PATENT DOCUMENTS

| | | |
|---|---|---|
| 2003/0016647 A1 | 1/2003 | Margon |
| 2005/0152313 A1 | 7/2005 | Cave et al. |
| 2008/0112351 A1 | 5/2008 | Surineni et al. |
| 2010/0232358 A1 | 9/2010 | Hu |
| 2011/0176500 A1 | 7/2011 | Wager et al. |
| 2012/0106520 A1 | 5/2012 | Champaney et al. |
| 2012/0236800 A1 | 9/2012 | Park et al. |
| 2013/0051256 A1 | 2/2013 | Ong et al. |
| 2013/0114452 A1 | 5/2013 | Raoul |
| 2013/0135995 A1 | 5/2013 | Wu et al. |
| 2013/0203458 A1 | 8/2013 | Charbit et al. |
| 2013/0235773 A1 | 9/2013 | Wang et al. |
| 2013/0301511 A1 | 11/2013 | Jo et al. |
| 2014/0079016 A1 | 3/2014 | Dai et al. |
| 2014/0269448 A1 | 9/2014 | Aggarwal et al. |
| 2015/0071060 A1 | 3/2015 | Bhushan et al. |

FOREIGN PATENT DOCUMENTS

| | | |
|---|---|---|
| WO | WO2007060545 A2 | 5/2007 |
| WO | WO-2011068765 A1 | 6/2011 |
| WO | WO-2012078565 A1 | 6/2012 |

COUPLING UPLINK AND DOWNLINK CCA IN LTE-U

CROSS REFERENCES

The present Application for patent is a Continuation Application of U.S. patent application Ser. No. 14/480,553 by Bhushan, et al., entitled, "Coupling Uplink and Downlink CCA in LTE-U," filed Sep. 8, 2014, and claims the benefit of U.S. Provisional Patent Application No. 61/876,655 by Bhushan et al., entitled "Coupling Uplink and Downlink CCA in LTE-U," filed Sep. 11, 2013. Both of these cross-referenced applications are assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more congested, operators are seeking ways to increase capacity. One approach may include the use of WLANs to offload some of the traffic and/or signaling of a cellular network. WLANs (or WiFi networks) may offer attractive features because, unlike cellular networks that operate in a licensed spectrum, WiFi networks generally operate in an unlicensed spectrum, and are thus available for use by various entities subject to established rules for providing fair access to the spectrum. However, access to unlicensed spectrum may need coordination to ensure that access points of the same or different operator deployments, using the same or different techniques for accessing the unlicensed spectrum, can co-exist and make effective use of the unlicensed spectrum. Furthermore, techniques for efficient use of various channels in the unlicensed spectrum may also be desirable.

SUMMARY

The described features generally relate to one or more improved systems, methods, and/or devices for wireless communications, and more particularly, to contention-based channel access procedures that may enhance efficiency in communications using unlicensed spectrum. In embodiments, a time period may be identified during which base stations perform contention-based downlink channel access procedures for access to a channel in an unlicensed spectrum. The base stations may be coordinated such that different base stations may seek channel access during different time intervals during the time period. Contention-based uplink channel access procedures for UEs may then be modified to favor one or more UEs that are associated with a base station that has won channel access. Thus, associated UEs and base stations may be likely to win channel access for uplink and downlink communications, respectively, and efficiency of the system may be enhanced.

According to some aspects, a method for wireless communication is provided. The method generally includes identifying a time period during which at least a first base station and a second base station perform contention-based downlink channel access procedures for access to a channel in an unlicensed spectrum, determining that the first base station has won or is more likely to win the downlink channel access, and modifying a contention-based uplink channel access procedure for a first UE associated with the first base station to favor the first UE gaining access to the channel in the unlicensed spectrum. The modifying may include, for example, adjusting a time for performing a clear channel assessment (CCA) at the first UE responsive to the determining. In some examples, determining that the first base station has won channel access may include monitoring a channel usage beacon signal (CUBS) of the base stations to determine that the first base station has won channel access.

In some examples, adjusting the time for performing the CCA may include changing a CCA interval of the first UE to be an earliest available CCA interval for performing the uplink channel access procedure. The method may also include modifying the uplink channel access procedure for a second UE associated with the second base station to favor the first UE gaining access to the channel in the unlicensed spectrum responsive to determining that the first base station has won channel access. Modifying the uplink channel access procedure for the second UE may include, for example, assigning a scheduled CCA interval for the first UE to the second UE when the second UE is scheduled to perform the uplink channel access procedure during the earliest available CCA interval. In some examples, modifying the uplink channel access procedure may include modifying a mapping function $F_U(\text{groupID}, t)$ for determining a CCA interval for the first UE based on groupIDs of the base stations as follows:

$$F_U^{mod}(\text{groupID}, t) = \begin{cases} 1 & \text{if } \text{groupID} = g_A(t) \\ F_U(g_A(t), t) & \text{if } \text{groupID} = g_B(t) \\ F_U(\text{groupID}, t) & \text{otherwise} \end{cases}$$

where $g_A(t)$=the groupID of the first base station, and $g_B(t)$=a groupID of one or more UEs which would have performed an uplink CCA in the earliest available CCA interval.

In some examples, modifying the uplink channel access procedure for the second UE may include determining a number of CCA intervals between a scheduled CCA interval for the first UE and the earliest available CCA interval, and shifting a scheduled CCA interval for the second UE by the determined number of CCA intervals. Such a shift may be determined, for example, according to a mapping function $F_U(\text{groupID}, t)$ for determining a CCA interval for the first UE based on groupIDs of the base stations as follows:

$$F_U^{mod}(\text{groundID}, t) = 1 + \text{mod}(F_U(\text{groupID}, t) - F_U(g_A(t), t), 7)$$

where $g_A(t)$=the groupID of the first base station. In some examples, modifying the uplink channel access procedure for the second UE may include deferring uplink channel access to a subsequent channel access period.

In further examples, modifying the contention-based uplink channel access procedure for the first UE may include determining a scheduled CCA interval of the first base station from a plurality of available CCA intervals, and setting a CCA interval for the first UE based on the scheduled CCA interval of the first base station. The time period during which the first base station and second base station perform the downlink channel access procedures may include CCA intervals in which the CCA intervals of the first base station and the second base station are non-overlapping. In other examples, the CCA intervals of the first base station and at least one other base station may be overlapping. When CCA intervals are overlapping, the CCA intervals may be determined based on a pseudo-random selection from available CCA intervals, and a group of base stations including the first base station and the at least one other base station may have a same CCA interval. Modifying the uplink channel access may include determining that one of the base stations of the group of base stations has won channel access to the channel, and adjusting a time for performing a CCA at the first UE and at least one other UE associated with the at least one other base station responsive to the determining. Such an adjustment may include, for example, selecting a CCA interval for UEs associated with the group of base stations from a set of CCA intervals, the set of CCA intervals comprising CCA intervals that are earlier than CCA intervals of one or more UEs associated with one or more base stations outside of the group of base stations.

In another aspect, an apparatus for wireless communication is provided. The apparatus generally includes means for identifying a time period during which at least a first base station and a second base station perform contention-based downlink channel access procedures for access to a channel in an unlicensed spectrum, means for determining that the first base station has won or is more likely to win the downlink channel access, and means for modifying a contention-based uplink channel access procedure for a first UE associated with the first base station to favor the first UE gaining access to the channel in the unlicensed spectrum. In some examples, the means for modifying may adjust a time for performing a CCA at the first UE responsive to the determining. Additionally or alternatively, the means for adjusting may change a CCA interval of the first UE to be an earliest available CCA interval for performing the uplink channel access procedure. The means for modifying, in some examples, may determine a scheduled CCA interval of the first base station from a plurality of available CCA intervals, and set a CCA interval for the first UE based on the scheduled CCA interval of the first base station.

In some examples, the time period during which the first base station and second base station perform the downlink channel access procedures may include CCA intervals, and the CCA intervals of the first base station and the second base station may be non-overlapping. In other examples, the CCA intervals of the first base station and at least one other base station may be overlapping. When CCA intervals are overlapping, the CCA intervals may be determined based on a pseudo-random selection from available CCA intervals, and a group of base stations including the first base station and the at least one other base station may have a same CCA interval. The means for modifying the uplink channel access procedure may determine that one of the base stations of the group of base stations has won channel access to the channel, and adjust a time for performing a CCA at the first UE and at least one other UE associated with the at least one other base station responsive to the determining.

In another aspect, an apparatus for wireless communications is provided. The apparatus generally includes a processor and memory in electronic communication with the processor. The processor may be configured to identify a time period during which at least a first base station and a second base station perform contention-based downlink channel access procedures for access to a channel in an unlicensed spectrum, determine that the first base station has won or is more likely to win the downlink channel access, and modify a contention-based uplink channel access procedure for a first UE associated with the first base station to favor the first UE gaining access to the channel in the unlicensed spectrum. The processor, in some examples, may be configured to adjust a time for performing a CCA at the first UE responsive to the determining, such as by causing the processor to change a CCA interval of the first UE to be an earliest available CCA interval for performing the uplink channel access procedure, for example. The processor, in some examples, may be configured to determine a scheduled CCA interval of the first base station from a plurality of available CCA intervals, and set a CCA interval for the first UE based on the scheduled CCA interval of the first base station.

In some examples, the time period during which the first base station and the second base station perform the downlink channel access procedures comprises CCA intervals, and the CCA intervals of the first base station and second base station may be non-overlapping. In other examples, the CCA intervals of the first base station and at least one other base station may be overlapping. In examples where CCA intervals may overlap, the CCA intervals may be determined based on a pseudo-random selection from available CCA intervals, and a group of base stations including the first base station and the at least one other base station may have a same CCA interval. The instructions may be executable by the processor to cause the processor to determine that one of the base stations of the group of base stations has won channel access to the channel, and adjust a time for performing a CCA at the first UE and at least one other UE associated with the at least one other base station responsive to the determining.

In another aspect, a non-transitory computer-readable medium is disclosed. The non-transitory computer-readable medium may store instructions executable by a processor, including: instructions to identify a time period during which at least a first base station and a second base station perform contention-based downlink channel access procedures for access to a channel in an unlicensed spectrum, instructions to determine that the first base station has won or is more likely to win the downlink channel access, and instructions to modify a contention-based uplink channel access procedure for a first UE associated with the first base station to favor the first UE gaining access to the channel in the unlicensed spectrum. The instructions, in some examples, may further include instructions to adjust a time for performing a clear channel assessment (CCA) at the first UE responsive to the determining, such as by causing the apparatus to change a CCA interval of the first UE to be an earliest available CCA interval for performing the uplink channel access procedure, for example.

In some examples, the time period during which the first base station and the second base station perform the downlink channel access procedures comprises CCA intervals, and the CCA intervals of the first base station and second base station may be non-overlapping. In other examples, the CCA intervals of the first base station and at least one other base station may be overlapping. In examples where CCA intervals may overlap, the CCA intervals may be determined based on a pseudo-random selection from available CCA intervals, and a group of base stations including the first base station and the at least one other base station may have a same CCA interval. The instructions may, in some examples, include instructions to determine that one of the base stations of the group of base stations has won channel access to the channel, and adjust a time for performing a CCA at the first UE and at least one other UE associated with the at least one other base station responsive to the determining.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
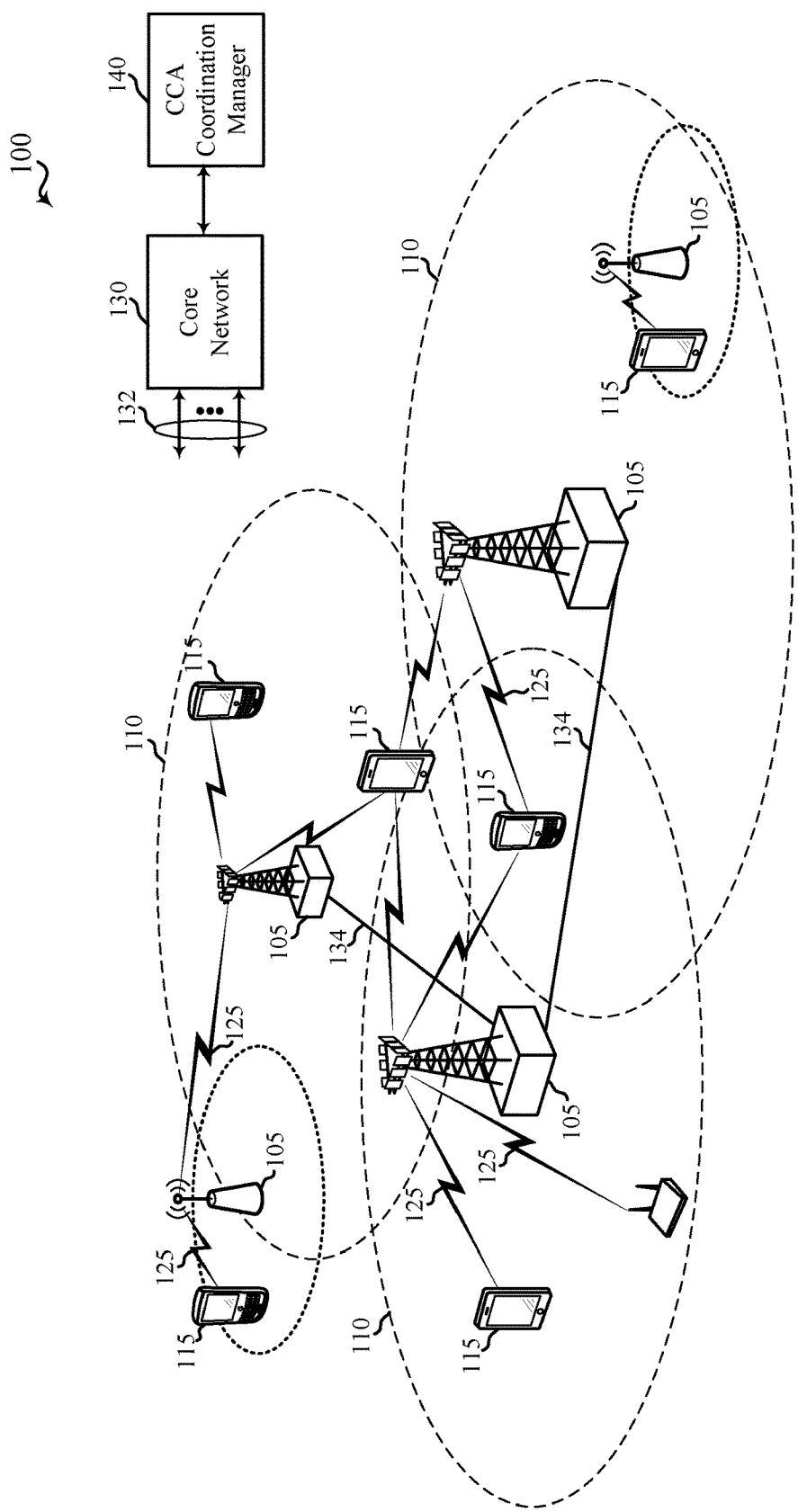
FIG. 1 shows a diagram of a wireless communications system.

Methods, apparatuses, systems, and devices are described in which an unlicensed spectrum (e.g., a spectrum typically used for WiFi communications) may be used for cellular communications (e.g., Long Term Evolution (LTE) communications). Specifically, the techniques disclosed herein may apply to LTE communications over an unlicensed spectrum.

With the increase in traffic because of offloading from cellular networks, access to an unlicensed spectrum may provide operators with opportunities for enhanced data transmission capacity. Prior to gaining channel access and transmitting using an unlicensed spectrum, a transmitting device may, in some deployments perform listen before talk (LBT) procedure to gain channel access. Such a LBT procedure may include a clear channel assessment (CCA) to determine if a particular carrier is available. If it is determined that a carrier is not available, a CCA may be performed again at a later time. Furthermore, use of an unlicensed spectrum may need coordination to ensure that access points of the same or different operator deployments, using the same or different techniques for accessing the unlicensed spectrum, may co-exist within the unlicensed spectrum.

In some cases, the co-existence may be facilitated by the coordination of CCAs performed by different devices or nodes that want to access the unlicensed spectrum. In some of the CCA coordination methods, CCAs may be coordinated to occur in predetermined time periods amongst multiple network entities that may desire to access the unlicensed spectrum. In embodiments, a time period may be identified during which multiple base stations may perform a CCA for downlink channel access in an unlicensed spectrum. The time periods for a CCA may be divided into multiple time intervals, and the base stations may be coordinated such that different base stations may seek channel access during different time intervals during the time period. Uplink CCA procedures for UEs may then be modified to favor one or more UEs that are associated with a base station that has won channel access. Thus, associated UEs and base stations may be likely to win channel access for uplink and downlink communications, respectively, and efficiency of the system may be enhanced.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The wireless communications system 100 includes a plurality of base stations (e.g., access points, eNBs, or WLAN access points) 105, a number of user equipments (UEs) 115, and a core network 130. Some of the access points 105 may communicate with the UEs 115 under the control of a base station controller (not shown), which may be part of the core network 130 or certain base stations 105 (e.g., access points or eNBs) in various embodiments. Some of the base stations 105 may communicate control information and/or user data with the core network 130 through backhaul 132. In some embodiments, some of the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some embodiments, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for a base station may be divided into sectors making up only a portion of the coverage area (not shown). The wireless communications system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some embodiments, the wireless communications system 100 may include an LTE/LTE-A communications system (or network) that supports one or more modes of operation or deployment scenarios for LTE/LTE-A in an unlicensed spectrum, and may employ coordinated contention-based channel access procedures among base stations 105 and UEs 115 in which the contention-based access procedures may be modified based on a base station 105 that obtains channel access through the contention-based procedure. In other embodiments, the wireless communications system 100 may support wireless communications using an unlicensed spectrum and an access technology different from LTE/LTE-A in an unlicensed spectrum, or a licensed spectrum and an access technology different from LTE/LTE-A. In LTE/LTE-A communications systems, the term evolved NodeB or eNB may be generally used to describe of the base stations 105. The wireless communications system 100 may be a Heterogeneous LTE/LTE-A or LTE/LTE-A in an unlicensed spectrum network in which different types of eNBs provide coverage for various geographical regions. For example, each base station 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the base stations may have similar frame and/or gating timing, and transmissions from different base stations may be approximately aligned in time. For asynchronous operation, the base stations may have different frame and/or gating timing, and transmissions from different base stations may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communications system 100 may include uplinks for carrying uplink (UL) transmissions (e.g., from a UE 115 to a base station 105) and/or downlinks for carrying downlink (DL) transmissions (e.g., from a base station 105 to a UE 115). The UL transmissions may also be called reverse link transmissions, while the DL transmissions may also be called forward link transmissions. The downlink transmissions may be made using a licensed spectrum, an unlicensed spectrum, or both. Similarly, the uplink transmissions may be made using a licensed spectrum, an unlicensed spectrum, or both.

In some embodiments of the wireless communications system 100, various deployment scenarios for LTE in an unlicensed spectrum may be supported including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., an eNB) and a UE may take place in an unlicensed spectrum. Each of the different modes may operate according to frequency division duplexing (FDD) or time division duplexing (TDD). OFDMA communications signals may be used in the communications links 125 for LTE downlink transmissions in an unlicensed and/or a licensed spectrum, while SC-FDMA communications signals may be used in the communications links 125 for LTE uplink transmissions in an unlicensed and/or a licensed spectrum. Transmissions using the unlicensed spectrum may be carried using one or more carrier frequencies in a frequency band. A frequency band, for example, may be divided into multiple carrier frequencies, and each carrier frequency may have the same bandwidth or different bandwidth. For example, each carrier frequency may occupy 20 MHz of a 5 GHz frequency band.

In many deployments, as mentioned above, a device seeking to transmit using an unlicensed spectrum may be required to verify that the spectrum is available for use in such a transmission, that is, the spectrum is not already in use by one or more other devices. Thus, prior to transmitting using the unlicensed spectrum, a device may perform a contention-based channel access procedure, also referred to as a listen before talk (LBT) procedure, in order to gain channel access. For example, a CCA may be used to determine availability of the unlicensed spectrum. Performance of a CCA generally involves checking that the desired spectrum is not otherwise occupied prior to initiating transmissions. In some embodiments, CCA opportunities are coordinated across multiple base stations 105, and may occur at periodic intervals, such as every 10 milliseconds (ms). A transmitting entity, such as a base station 105, may desire channel access and perform a CCA to determine if a particular carrier frequency in the unlicensed spectrum is occupied. If the particular carrier frequency in the unlicensed spectrum is occupied, the base station 105 waits until the next CCA opportunity before attempting to obtain channel access again on the associated carrier frequency. In deployments that provide CCA opportunities once every 10 ms, the base station 105 would then have to wait 10 ms before attempting channel access. Similarly, a UE 115 may desire to transmit uplink data to a base station 105, and perform a CCA in a similar manner.

In some embodiments, TDD may be used for communications using the unlicensed spectrum, in which for a particular TDD frame, some subframes are used for downlink communications and some subframes are used for uplink communications. As will be readily understood, in order to provide enhanced system efficiency and reduced latency, it would be desirable for both a base station 105 and an associated UE 115 to communicate in a same TDD frame. Thus, in such situations it would be desirable to increase the likelihood of both the base station 105 and UE 115 both gain access to the unlicensed spectrum. According to various embodiments described herein, in deployments that may utilize an unlicensed spectrum, CCA opportunities may be modified to favor successful channel access for UEs 115 that are associated with a base station that has gained channel access. Additional details regarding the implementation of LTE deployment scenarios or modes of operation for an unlicensed spectrum in a system such as the wireless communications system 100, as well as other features and functions related to the operation of LTE in an unlicensed spectrum, are provided below with reference to FIGS. 2-16.

Figure 2:
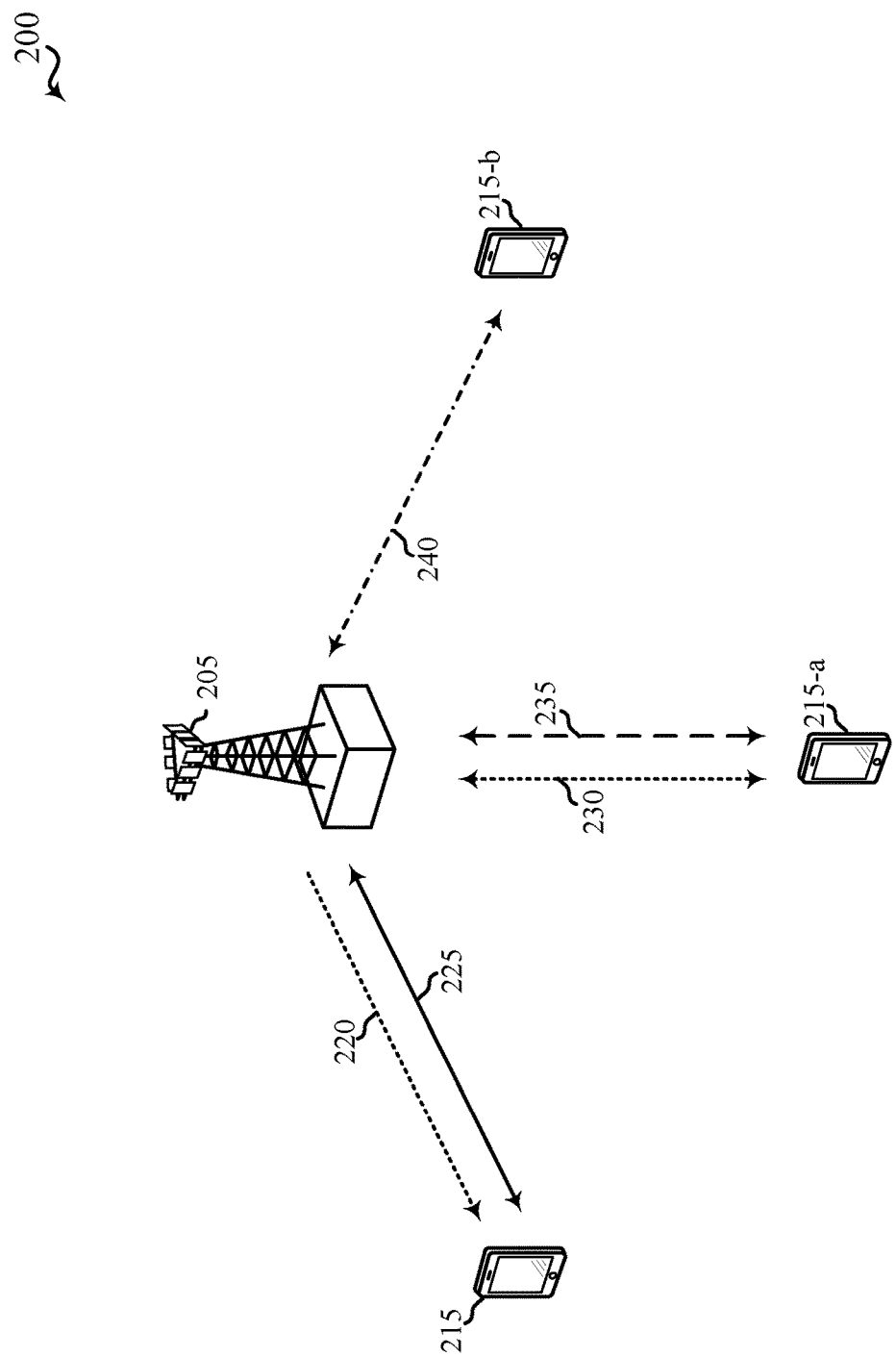
FIG. 2 shows a diagram of a wireless communications system that illustrates examples of deployment scenarios for using LTE in an unlicensed spectrum according to various embodiments.

Turning next to FIG. 2, a wireless communications system 200 illustrates examples of a supplemental downlink mode, a carrier aggregation mode, and a standalone mode, for an LTE network that supports LTE/LTE-A in an unlicensed spectrum. The wireless communications system 200 may be an example of portions of the wireless communications system 100 described with reference to FIG. 1. Moreover, the base station 205 may be an example of one of the base stations 105 of FIG. 1, while the UEs 215 may be examples of the UEs 115 described with reference to FIG. 1.

In the example of a supplemental downlink mode in wireless communications system 200, the base station 205 may transmit OFDMA communications signals to a UE 215 using downlink 220. In the example of FIG. 2, downlink 220 may be associated with a frequency in an unlicensed spectrum. The base station 205 may transmit OFDMA communications signals to the same UE 215 using a bidirectional link 225 and may receive SC-FDMA communications signals from that UE 215 using the bidirectional link 225. The bidirectional link 225 may be associated with a frequency in a licensed spectrum. The downlink 220 in the unlicensed spectrum and the bidirectional link 225 in the licensed spectrum may operate concurrently. The downlink 220 may provide a downlink capacity offload for the base station 205. In some embodiments, the downlink 220 may be used for unicast services (e.g., addressed to one UE) or for multicast services (e.g., addressed to several UEs). This scenario may occur with any service provider (e.g., a traditional mobile network operator or MNO) that uses a licensed spectrum and needs to relieve some of the traffic and/or signaling congestion.

In one example of a carrier aggregation mode in wireless communications system 200, the base station 205 may transmit OFDMA communications signals to a UE 215-a using a bidirectional link 230 and may receive SC-FDMA communications signals from the same UE 215-a using the bidirectional link 230. In the example of FIG. 2, bidirectional link 230 that may be associated with a frequency in an unlicensed spectrum. The base station 205 may also transmit OFDMA communications signals to the same UE 215-a using a bidirectional link 235 and may receive SC-FDMA communications signals from the same UE 215-a using the bidirectional link 235. The bidirectional link 235 may be associated with a frequency in a licensed spectrum. The bidirectional link 230 may provide a downlink and uplink capacity offload for the base station 205. Like the supplemental downlink described above, this scenario may occur with any service provider (e.g., an MNO) that uses a licensed spectrum and needs to relieve some of the traffic and/or signaling congestion. Bidirectional link 230 may operate using TDD communications, according to some examples. As both the base station 205 and UE 215-a transmit data using bidirectional link 230, each would perform an LBT procedure prior to transmitting data using the bidirectional link 230 on the unlicensed spectrum.

In an example of a standalone mode in wireless communications system 200, the base station 205 may transmit OFDMA communications signals to a UE 215-b using a bidirectional link 240 and may receive SC-FDMA communications signals from the same UE 215-b using the bidirectional link 240. Bidirectional link 230 may operate using TDD communications, according to some examples. The bidirectional link 240 may provide a downlink and uplink capacity offload for the base station 205. This example and those provided above are presented for illustrative purposes and there may be other similar modes of operation or deployment scenarios that combine LTE in a licensed spectrum and LTE in an unlicensed spectrum for capacity offload.

As described above, a service provider that may benefit from the capacity offload offered by using LTE in an unlicensed band may be a traditional MNO with LTE spectrum. For these service providers, an operational configuration may include a bootstrapped mode (e.g., supplemental downlink, carrier aggregation) that uses an LTE primary component carrier (PCC) on a licensed spectrum and a secondary component carrier (SCC) on an unlicensed spectrum.

In the supplemental downlink mode, control for LTE in an unlicensed spectrum may be transported over the LTE uplink (e.g., uplink portion of the bidirectional link 225). One of the reasons to provide downlink capacity offload is because data demand is largely driven by downlink consumption. Moreover, in this mode, there may be reduced regulatory impact since the UE 215 is not transmitting in the unlicensed spectrum.

In the carrier aggregation mode, data and control may be communicated in a licensed spectrum (e.g., bidirectional link 235) while data may be communicated in an unlicensed spectrum (e.g., bidirectional link 230). The carrier aggregation mechanisms supported when using the unlicensed spectrum may fall under a hybrid frequency division duplexing-time division duplexing (FDD-TDD) carrier aggregation or a TDD-TDD carrier aggregation with different symmetry across component carriers.

In any of the various operation modes, communications may be transmitted on one or multiple carrier frequencies in the unlicensed spectrum. According to various embodiments, as mentioned above, communications may be transmitted according to TDD techniques. As is understood, a number of subframes in TDD communications may include downlink data, and a number of subframes may include uplink data. Thus, if a base station 205 is communicating with a UE 215 according to TDD, it may be beneficial for both the UE 215 and base station 205 to both have access to the channel in the unlicensed spectrum.

Figure 3:
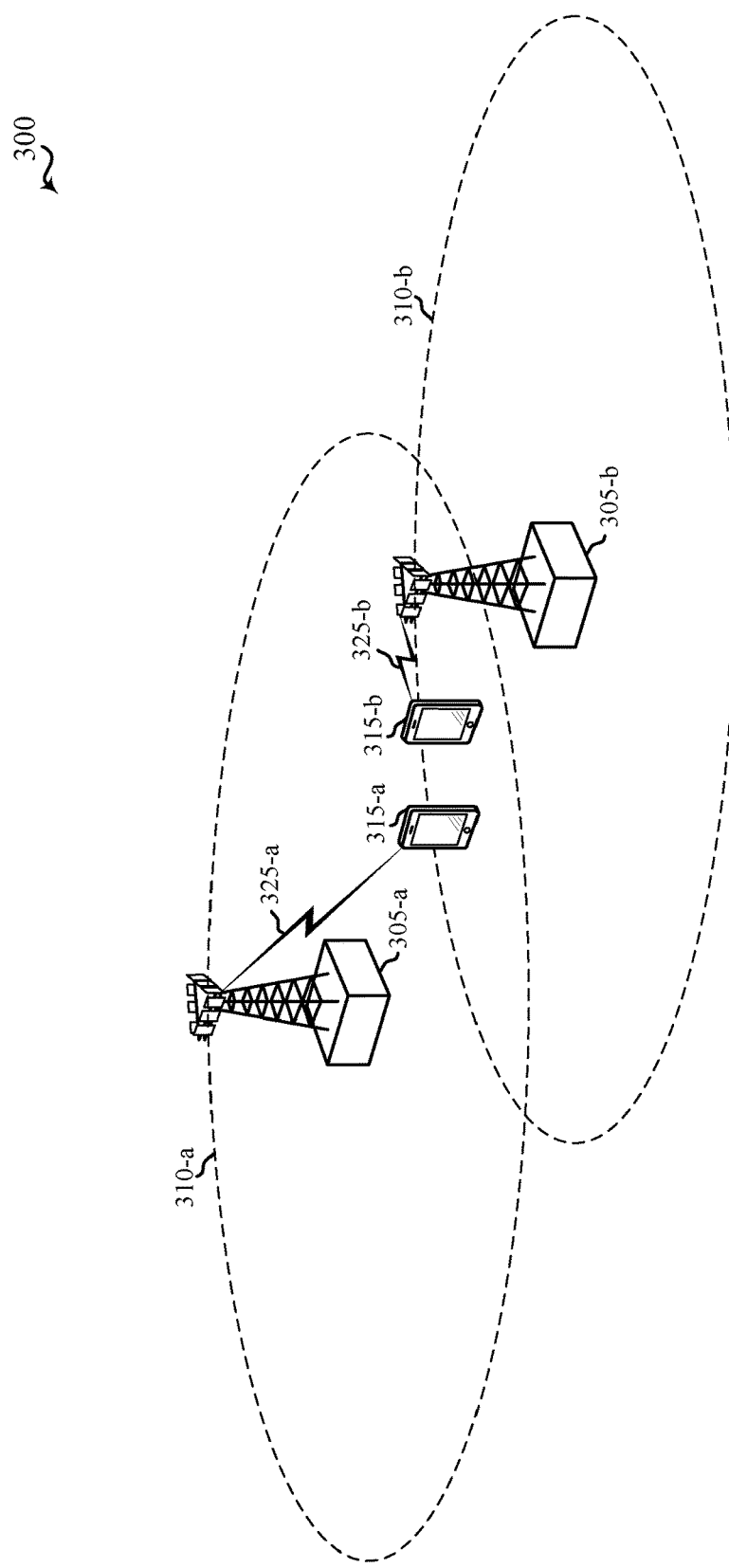
FIG. 3 shows a diagram of neighboring base stations and associated UEs according to various embodiments.

With reference now to FIG. 3, a portion of a wireless communications system 300 is illustrated in which multiple base stations 305-a and 305-b may have overlapping coverage areas 310-a and 310-b, respectively. In this example, base station 305-a may communicate with UE 315-a using communications link 325-a, which may be a TDD communication link. Similarly, base station 305-b may communicate with UE 315-b using communications link 325-b, which may be a TDD communication link. According to some deployments, base stations 305 and UEs 315 may contend for the channel independently, on each frame. As a result, a base station 305 that wins a channel on may send downlink packets or an uplink grant to a UE 315 that may, however, fail to win the channel in the subsequent portion of the frame. For example, base station 305-a may win a channel and transmit downlink subframes to UE 315-a, but UE 315-b may win the channel for transmitting uplink data. In such a case, the downlink packets from base station 305-a that are received at UE 315-a may remain unacknowledged and/or an uplink grant associated with the TDD frame may go unused.

While the unacknowledged downlink packets may be acknowledged in some subsequent frame, this can incur additional delay which may impact the efficiency of the wireless communications system 300, such as by impacting the efficiency of a hybrid automatic repeat request (H-ARQ) process in LTE in an unlicensed spectrum. Similarly, an unused uplink grant may result in wasted uplink bandwidth, which could have been assigned to another UE (not shown) served by the base station 305-a. Note that the different issues may impact system 300 performance based on an operations mode of the system, such as the modes described with respect to FIG. 2. For example, an unacknowledged downlink packet may occur in a standalone deployment for an unlicensed spectrum, where the unlicensed carrier in question is a primary component carrier (PCC), but may not occur in a supplemental downlink mode, in which acknowledgment may be transmitted by the UE 315-a using a licensed spectrum. An unused uplink grant may occur both in standalone deployments, as well as in carrier aggregation deployments where the unlicensed carrier is a secondary component carrier (SCC), anchored to a primary component carrier (PCC) in the licensed spectrum. According to various embodiments described herein, techniques are provided that increase the chances that UE 315-a wins channel contention in a LBT frame where its serving base station 305-a has won channel contention.

Figure 4A:
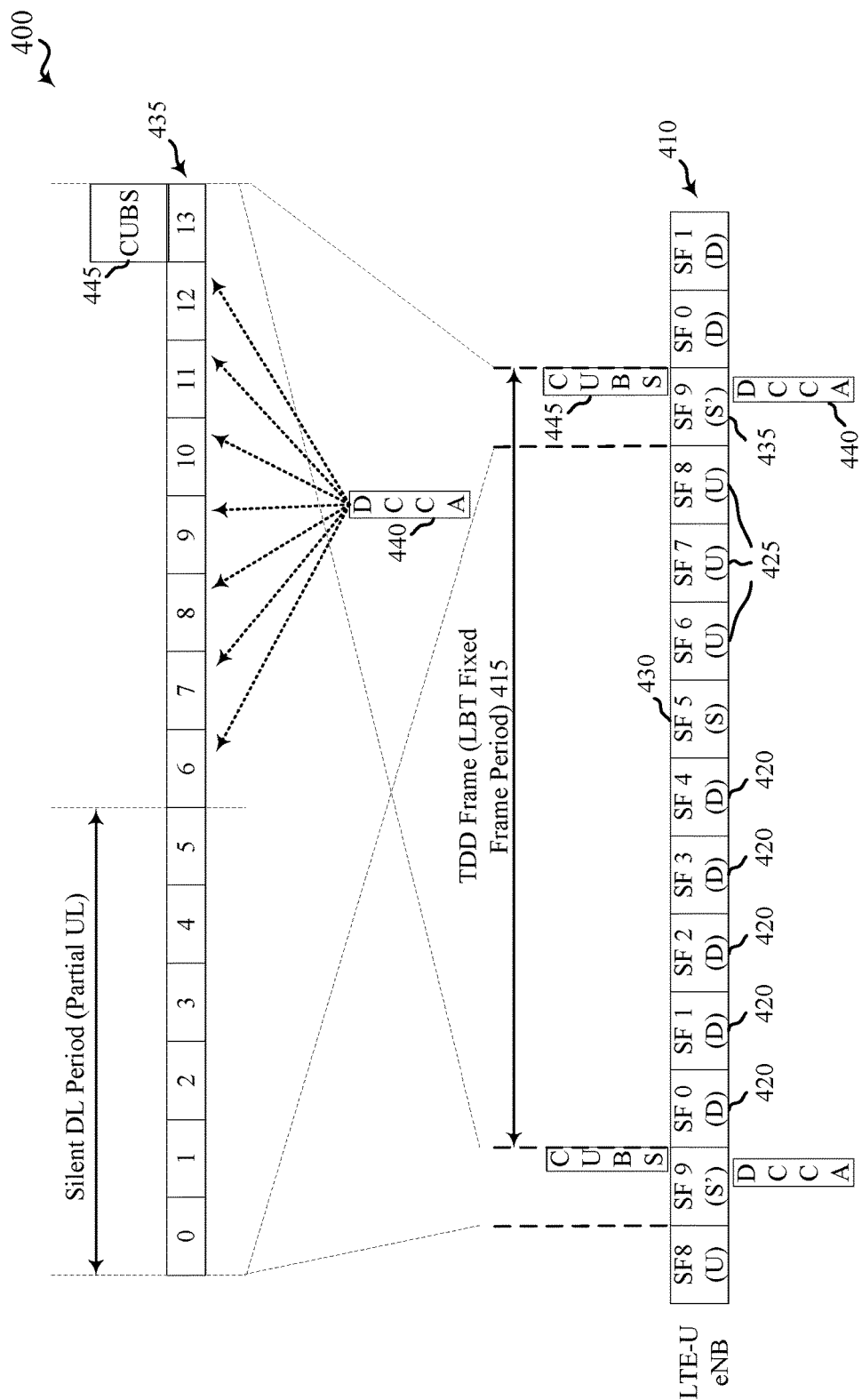
FIG. 4A illustrates an example of a time division duplexing (TDD) frame and associated subframes for a particular TDD uplink (UL)/downlink (DL) configuration, and downlink CCA intervals that may be used by base stations for contention-based channel access, according to various embodiments.

Referring now to FIG. 4A, an example 400 is provided that illustrates a TDD communication 410. A TDD frame 415, which may correspond to a LBT fixed frame period, may be 10 ms and include a number of downlink subframes 420, a number of uplink subframes 425, and two types of special subframes, an S subframe 430 and an S' subframe 435. The S subframe 430 serves as a transition between downlink subframes 420 and uplink subframes 425, while the S' subframe 435 serves as a transition between uplink subframes 425 and downlink subframes 420. During the S' subframe, a downlink CCA (D-CCA) may be performed by a base station, such as base stations 105, 205, and/or 305 described above with respect to FIGS. 1-3. Following a successful CCA, a base station may transmit a channel usage beacon signal (CUBS) 445 to provide an indication that the base station has won the channel.

The S' subframe 435 may include 14 OFDM symbols, numbered 0 through 13 in FIG. 4A. A first portion of the S' subframe, symbols 0 through 5 in this example, may be used by base stations as an off time, which may be required for use of the unlicensed spectrum. Thus, a base station will not transmit data during this period, although a UE may transmit some amount of data during such a period, and thus some uplink data may be transmitted in this period, according to various embodiments. A second portion of the S' subframe 435 may be used for D-CCA 440. In the example of FIG. 4A, the S' subframe 435 includes seven D-CCA intervals, included in symbols 6 through 12 in the example of FIG. 4A. As noted above, CCAs in a system may be coordinated in order to provide more efficient system operation. In some embodiments, in order to determine which of the seven possible intervals is used to perform a D-CCA, the base station in an unlicensed spectrum evaluates a mapping-function of the form $$F_D(\text{GroupID}, t) \in \{1,2,3,4,5,6,7\}$$

where GroupID is a "deployment group-id" assigned to the base station, and t is the LBT frame number, corresponding to TDD frame (LBT fixed frame period) 415 in the example of FIG. 4A.

Figure 4B:
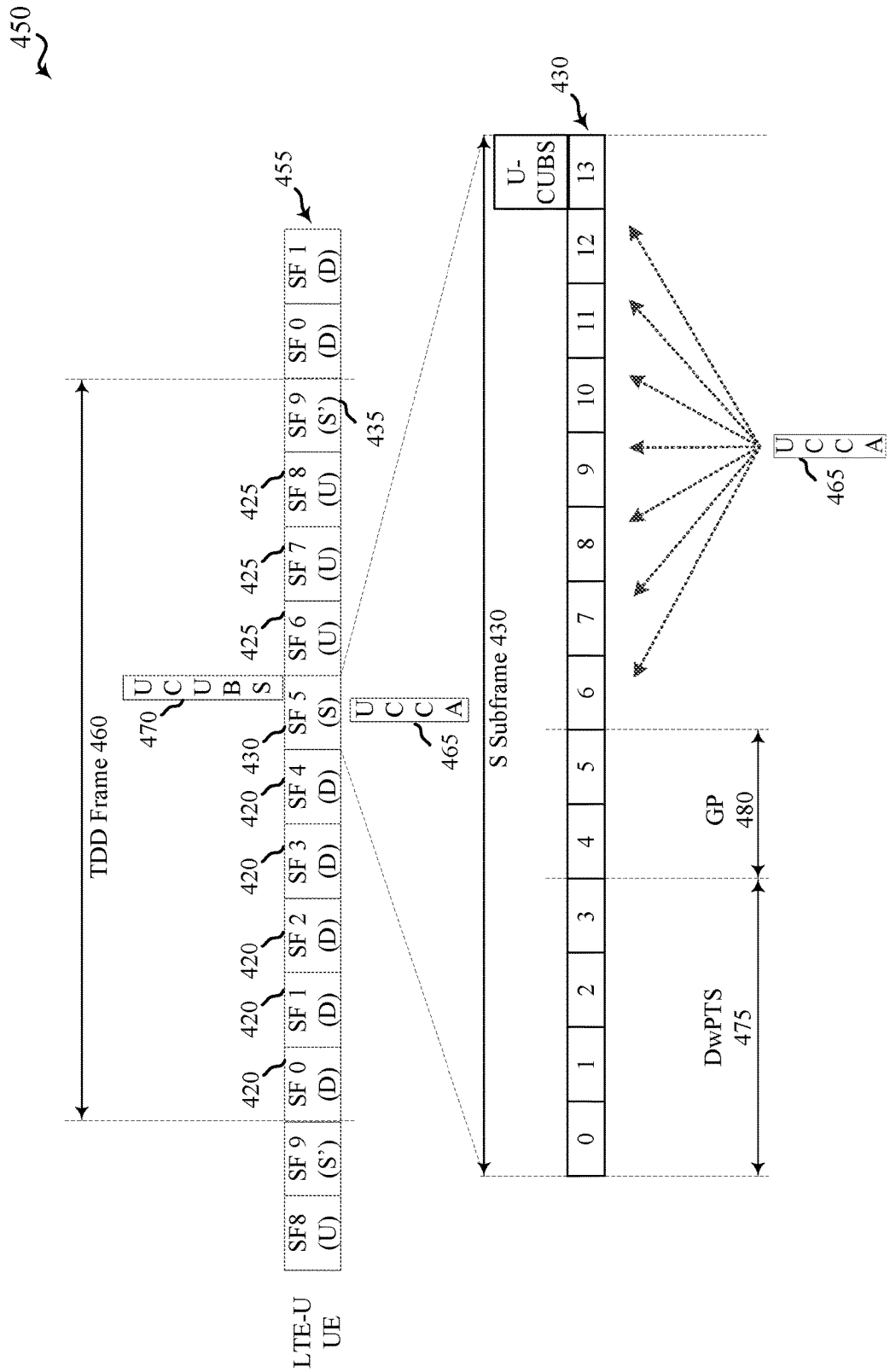
FIG. 4B illustrates an example of a TDD frame and associated subframes for a particular TDD UL/DL configuration, and uplink CCA intervals that may be used by UEs for contention-based channel access, according to various embodiments.

Referring now to FIG. 4B, an example 450 is provided that illustrates a TDD communication 455. A TDD frame 460, corresponds to TDD frame 415 of FIG. 4A, and may correspond to a LBT fixed frame period, and includes a number of downlink subframes 420, a number of uplink subframes 425, and two types of special subframes, an S subframe 430 and an S' subframe 435. As discussed above, the S subframe 430 serves as a transition between downlink subframes 420 and uplink subframes 425, while the S' subframe 435 serves as a transition between uplink subframes 425 and downlink subframes 420. During the S subframe 430, uplink CCA (U-CCA) 465 may be performed by a UE, such as UEs 115, 215, and/or 315 described above with respect to FIGS. 1-3. Following a successful U-CCA 465, a UE may transmit a channel usage beacon signal (CUBS) 470 to provide an indication that the UE has won the channel.

The S subframe 430 may include 14 OFDM symbols, numbered 0 through 13 in FIG. 4B. A first portion of the S subframe 430, symbols 0 through 3 in this example, may be a downlink pilot time slot (DwPTS) 475, and a second portion of the S subframe 430 may be a guard period (GP) 480. A third portion of the S subframe 430 may be used for U-CCA 465. In the example of FIG. 4B, the S subframe 430 includes seven U-CCA intervals, included in symbols 6 through 12 in the example of FIG. 4B. As noted above, CCAs in a system may be coordinated in order to provide more efficient system operation. In some embodiments, in order to determine which of the seven possible intervals is used to perform a U-CCA, the UE in an unlicensed spectrum evaluates a mapping-function, similarly as with the D-CCA mapping function, of the form:

$$F_U(\text{GroupID}, t) \in \{1,2,3,4,5,6,7\}$$

where GroupID is a "deployment group-id" assigned to the UE, and t is the LBT frame number, corresponding to TDD frame (LBT fixed frame period) 460 in the example of FIG. 4B.

The CCA-mapping functions may be constructed based on different criteria, depending on whether the mapping function will have an orthogonalization or a non-orthogonalization property. In examples with orthogonal CCA access, the mapping function may have the orthogonalization property, according to:

$$F_{D/U}(x,t) \neq F_{D/U}(y,t)$$

$$\text{GroupID } x, y \in \{1,2,3,4,5,6,7\}$$

for all time t, whenever x≠y represent different group-ids. In this case, LTE nodes (base stations/UEs) in an unlicensed spectrum with different group-ids may perform a CCA during non-overlapping CCA time intervals. In the absence of any non LTE interference, the node with the group-id which maps to an earlier CCA interval will secure the channel, which it may then use over the next LBT frame. According to various deployments, the mapping-function is fair, in the sense that across different time indices t, the mapping $\{F_{D/U}(x, t), t=1, 2, 3, \ldots\}$ varies such that different group-ids have an equal chance of mapping to an earlier CCA interval (and hence secure the channel in the absence of other interference) over a suitably long interval of time.

All LTE nodes deployed by the same operator/service-provider may be assigned the same group-id, so that they do not preempt each other in the contention process. This allows full frequency reuse among LTE nodes of the same deployment, leading to enhanced system throughput. LTE nodes of different deployments may be assigned different group-ids, so that with orthogonal CCA-mapping, access to the channel is mutually exclusive.

In examples with non-orthogonal, or overlapping, CCA access, the mapping function may allow more than seven group ids. In some situations, for example, it may be useful to support more than 7 deployment group-ids, in which case it is not possible to maintain the orthogonality property of CCA-mapping functions. In such cases, it is desirable to reduce the frequency of collision between any two group-ids. In some embodiments, non-orthogonal CCA sequences may also be used to provide fair channel sharing among deployments without tight coordination on CCA opportunities. One example of a non-orthogonal CCA-mapping is given by $$F_{D/U}(x,t) = R_{1,7}(x,t)$$

$$\text{GroupID } x = \in \{1, 2, \ldots 2^{\wedge}16\}$$

where $R_{1,7}(x,t)$ is a pseudo-random number generator between 1 and 7 chosen independently for GroupID x. In this case, there could be potential collisions between LTE nodes of different GroupIDs in the same LBT frame t.

Thus, CCA intervals may be selected according to the noted mapping functions, and used for D-CCA 440 and U-CCA 465. As mentioned above, a UE may have a serving base station that may win channel contention and may transmit data in downlink subframes 420 to the UE. In such cases, it may be desirable for the UE to then transmit data in the uplink subframes 425. Various embodiments described herein provide for improved chances that the UE served by the base station that will win contention to transmit data during uplink subframes 425.

Figure 5:
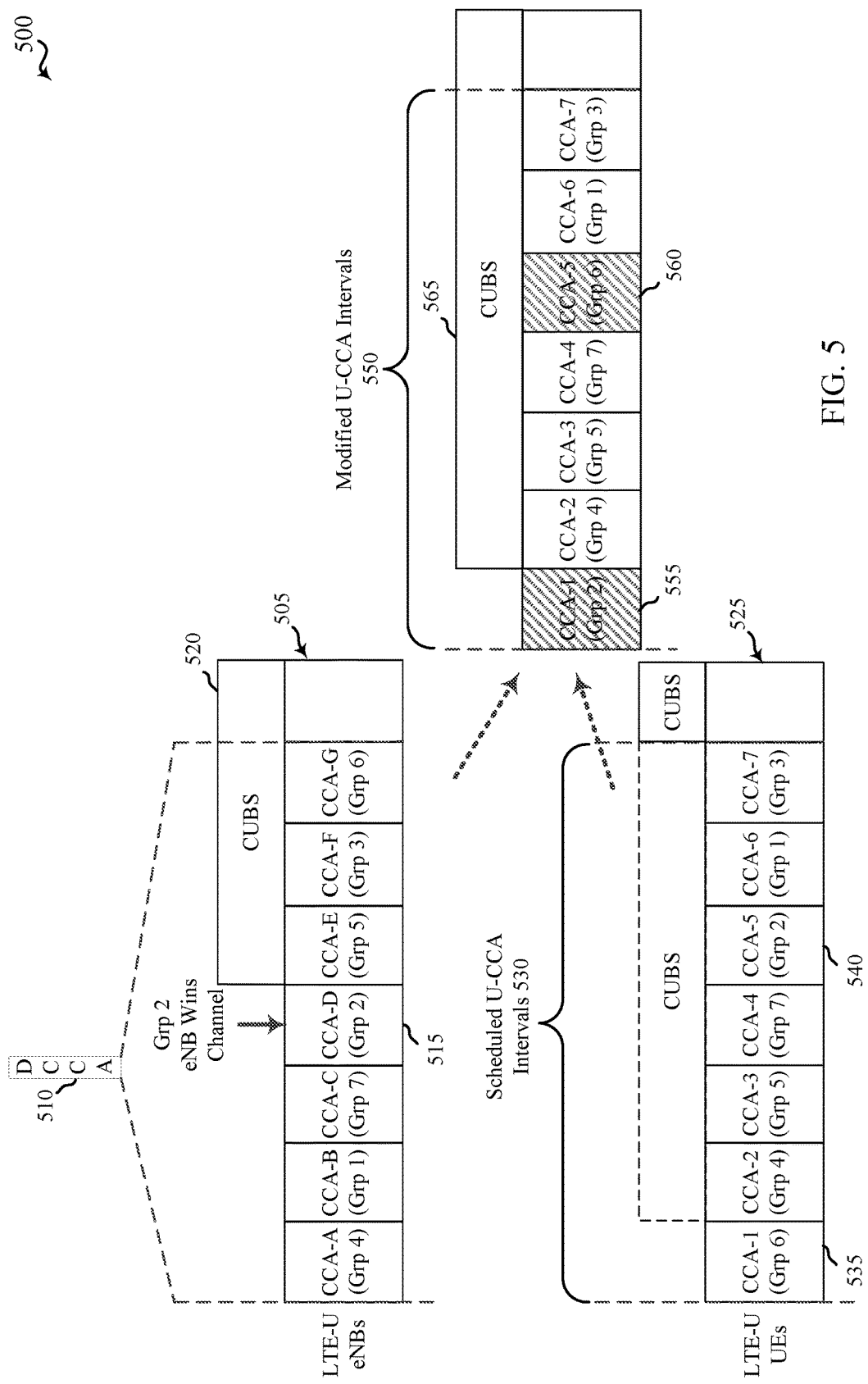
FIG. 5 illustrates an example of modified uplink CCA intervals based on a base station that wins channel access, according to various embodiments.

FIG. 5 illustrates an example 500 of contention-based channel access and modifications that may be made to contention-based procedures according to various embodiments. In example 500, base stations may perform D-CCA 510 during a D-CCA 510 portion of a S' subframe 505, which may be an example of S' subframe 435 of FIG. 4. Similarly, UEs may have scheduled U-CCA intervals 530 during a U-CCA portion of an S subframe 525, which may be an example of S subframe 430 of FIG. 4. In some embodiments, portions of example 500 may be carried out by one or more of the base stations 105, 205, 305 and/or UEs 115, 215, 315 described with reference to FIGS. 1, 2, and/or 3.

During D-CCA 510, base stations of up to seven group ids (Grp 1 through Grp 7 of FIG. 5), may be mapped to CCA time intervals indicated as CCA-A through CCA-G in FIG. 5. Depending upon the results of the mapping function, different group ids may occupy different CCA intervals. In this example, group id 4 occupies CCA-A, group id 1 occupies CCA-B, group id 7 occupies CCA-C, group id 2 occupies CCA-D, group id 5 occupies CCA-E, group id 3 occupies CCA-F, and group id 6 occupies CCA-G. In this example a base station with group id 2 wins the channel, as indicated at 515, with the base station then transmitting a CUBS 520 for the reminder of the subframe 505.

UEs within the coverage area of the base station that won the channel may receive the CUBS 520 and determine that the particular base station of group id 2 won the channel either through information included in a payload of the CUBS 520, or by determining that the CUBS 520 was transmitted starting immediately following the CCA interval CCA-D that is associated with group id 2 based on the mapping function. As discussed above, UEs may have CCA mapping functions that may be used to determine CCA time intervals for performing a U-CCA. In the example of FIG. 5, scheduled U-CCA intervals 530 (designated as CCA-1 through CCA-7) may be determined according to such a mapping function, with CCA-1 through CCA-7 mapped to, respectively, group ids 6, 4, 5, 7, 2, 1, and 3. As noted above, in this example a base station of group id 2 won downlink channel contention, and thus it would be desirable for a UE in group id 2 to also win uplink channel contention. The chances of such a result may be increased if a UE of group id 2 were allowed to perform a U-CCA during CCA-1 535. However, according to the mapping function, CCA-1 is occupied by group id 6, as indicated at 535, and CCA-5 is occupied by group id 2, as indicated at 540.

According to some embodiments, a UE of group id 2 may be favored to gain access to the channel through a modification of the mapping function that generates modified U-CCA intervals 550. In this embodiment, UEs with group id 2 may be favored by providing such UEs with the first U-CCA time interval 555. In this embodiment, UEs with group id 6, which may otherwise occupy this interval may be moved to U-CCA time interval CCA-5, as indicated at 560. Thus, UEs with group ids 1 and 6 may swap U-CCA intervals to thereby favor UEs of group id 2, based on the base station with group id 2 winning the channel during D-CCA 510. In this example, a UE with group id 2 may perform a U-CCA in time interval 555 and gain channel access, and then transmit a CUBS 565 until the start of the subsequent uplink subframe. Of course, it will be readily understood that the particular example of FIG. 5 is provided for illustration and discussion purposes, and numerous different examples will be readily recognized by one of skill in the art.

The mapping function in such embodiments, as noted, may be modified to favor UEs with a same group id as a base station that won downlink channel contention. Such a modification may be determined by letting $g_A(t)$ denote the group id of the base station(s) that won channel contention in LBT frame t, and letting $g_B(t)$ denote the group id of the UE(s) which would have performed an uplink CCA in the earliest CCA interval, in the same LBT frame t, (that is, let $F_U(g_B(t), t)=1$). In this case, the modified CCA-mapping function for the uplink is modified by swapping the uplink CCA interval for group-ids $g_A$ and $g_B$, and allowing UEs with group-id $g_A(t)$ take the first CCA interval, while the UEs with group-id $g_B(t)$ perform a CCA in a later interval that was nominally assigned to $g_A(t)$ More formally, the modified CCA-mapping function of such embodiments may be given by:

$$F_U^{mod}(g, t) = \begin{cases} 1 & \text{if } g = g_A(t) \\ F_U(g_A(t), t) & \text{if } g = g_B(t) \\ F_U(g, t) & \text{otherwise} \end{cases}$$

With this approach, UEs whose serving base station won downlink channel contention would be favored to win uplink channel contention whenever the base station that won channel contention continues to transmit all the way up to (and including) the DwPTS portion of the S subframe, and none of the WiFi nodes in the vicinity win the channel during the guard period of the S subframe. In some examples, WiFi nodes in the vicinity of the base station and UE that have data to transmit will likely have a sufficiently large contention window (CW) size that the UE will be favored to win channel access. The first condition may be accomplished, in some embodiments, through a base station scheduler that issues uplink grants and downlink data to its UEs preferentially in those LBT frames where it has enough downlink data to occupy most, if not all of the D and (DwPTS portion of) S subframes in that radio frame. Additionally or alternatively, the base station may choose to occupy the channel during a LBT frame predominantly (or even solely) in order to protect the uplink channel contention process for a UE from which it expects to receive data/feedback during that LBT frame.

Figure 6:
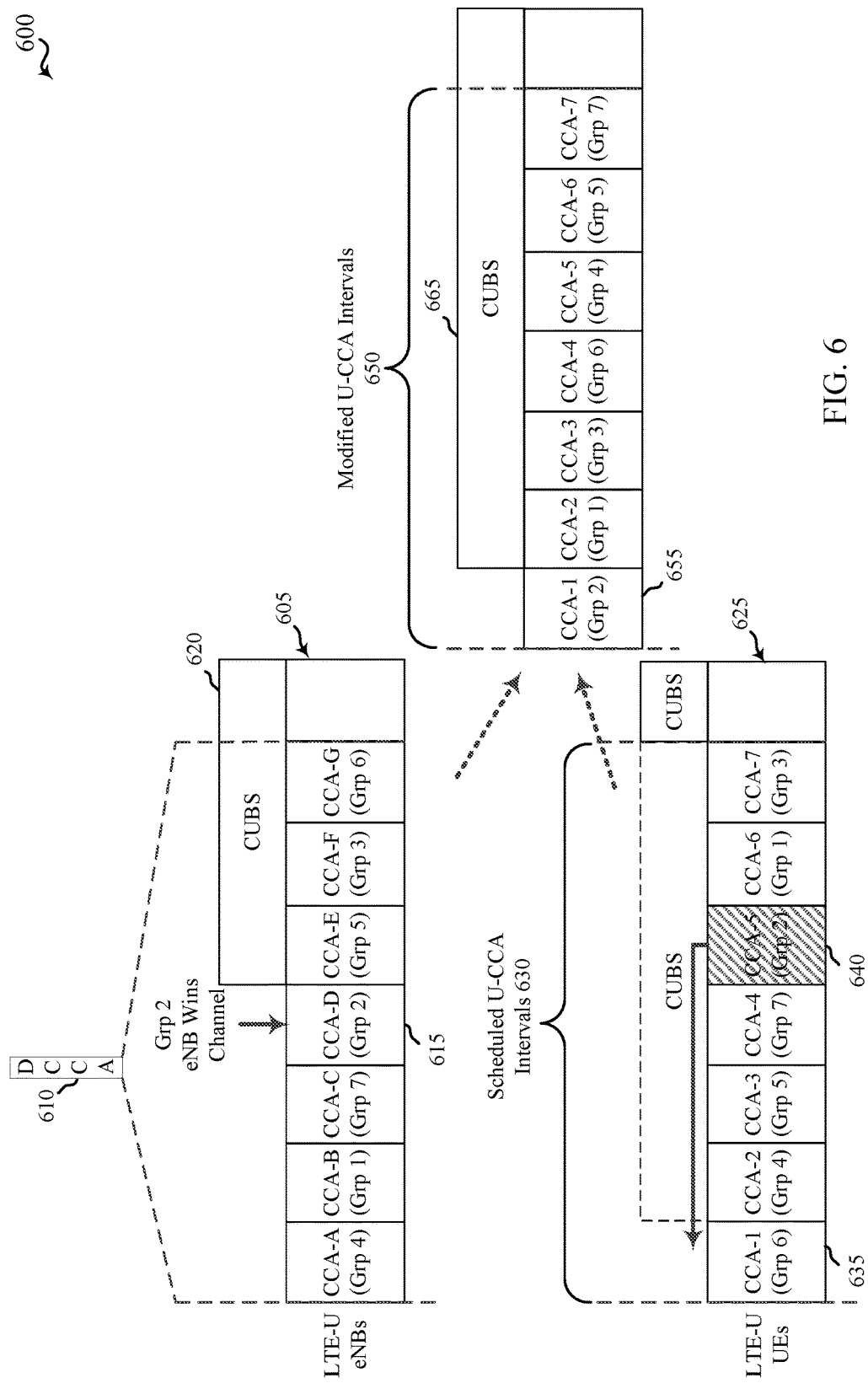
FIG. 6 illustrates another example of modified uplink CCA intervals based on a base station that wins channel access, according to various embodiments.

FIG. 6 illustrates an example 600 of contention-based channel access and modifications that may be made to contention-based procedures according to various embodiments. In example 600, base stations may perform D-CCA 610 during a D-CCA 610 portion of an S' subframe 605, which may be an example of S' subframe 435 of FIG. 4. Similarly, UEs may have scheduled U-CCA intervals 630 during a U-CCA portion of an S subframe 625, which may be an example of S subframe 430 of FIG. 4. In some embodiments, portions of example 600 may be carried out by one or more of the base stations 105, 205, 305 and/or UEs 115, 215, 315 described with reference to FIGS. 1, 2, and/or 3.

During D-CCA 610, base stations of up to seven group ids (Grp 1 through Grp 7 of FIG. 6), may be mapped to CCA time intervals indicated as CCA-A through CCA-G in FIG. 6. As discussed above, depending upon the results of the mapping function, different group ids may occupy different CCA intervals. In this example, group id 4 occupies CCA-A, group id 1 occupies CCA-B, group id 7 occupies CCA-C, group id 2 occupies CCA-D, group id 5 occupies CCA-E, group id 3 occupies CCA-F, and group id 6 occupies CCA-G. In this example, a base station with group id 2 wins the channel, as indicated at 615, with the base station then transmitting a CUBS 620 for the reminder of the subframe 605.

UEs within the coverage area of the base station that won the channel may receive the CUBS 620 and determine that the particular base station of group id 2 won the channel either through information included in a payload of the CUBS 620, or by determining that the CUBS 620 was transmitted starting immediately following the CCA interval CCA-D that is associated with group id 2 based on the mapping function. As discussed above, UEs may have CCA mapping functions that may be used to determine CCA time intervals for performing a U-CCA. In the example of FIG. 6, scheduled U-CCA intervals 630 (designated as CCA-1 through CCA-7) may be determined according to such a mapping function, with CCA-1 through CCA-7 mapped to, respectively, group ids 6, 4, 5, 7, 2, 1, and 3. As noted above, in this example a base station of group id 2 won downlink channel contention, and thus it would be desirable for a UE in group id 2 to also win uplink channel contention. The chances of such a result may be increased if a UE of group id 2 were allowed to perform a U-CCA during CCA-1 635. However, according to the mapping function, CCA-1 is occupied by group id 6, as indicated at 635, and CCA-5 is occupied by group id 2, as indicated at 640.

According to some embodiments, a UE of group id 2 may be favored to gain access to the channel through a modification of the mapping function that generates modified U-CCA intervals 650. In this embodiment, UEs with group id 2 may be favored by providing such UEs with the first U-CCA time interval 655, and shifting the CCA intervals of the remaining group ids by the corresponding number of CCA intervals. In this embodiment, each group id is shifted to the left by four CCA intervals. In this example, a UE with group id 2 may perform a U-CCA in time interval 655 and gain channel access, and then transmit a CUBS 665 until the start of the subsequent uplink subframe. Of course, it will be readily understood that the particular example of FIG. 6 is provided for illustration and discussion purposes, and numerous different examples will be readily recognized by one of skill in the art.

The mapping function in such embodiments, as noted, may be modified to favor UEs with a same group id as a base station that won downlink channel contention. Using the same terminology as in FIG. 5, a modified U-CCA mapping function may be defined as follows:

$$F_U^{mod}(g,t)=1+\mathrm{mod}(F_U(g,t)-F_U(g_A(t),t),7)$$

This would thus ensure that $F_U^{mod}(g_A(t)\ t)=1$, as required. In such embodiments, the uplink mapping for every group-id depends on the group-id $g_A$ that won the downlink contention, and thus each UE, not just UEs in affected group ids, would modify their mapping function.

Figure 7:
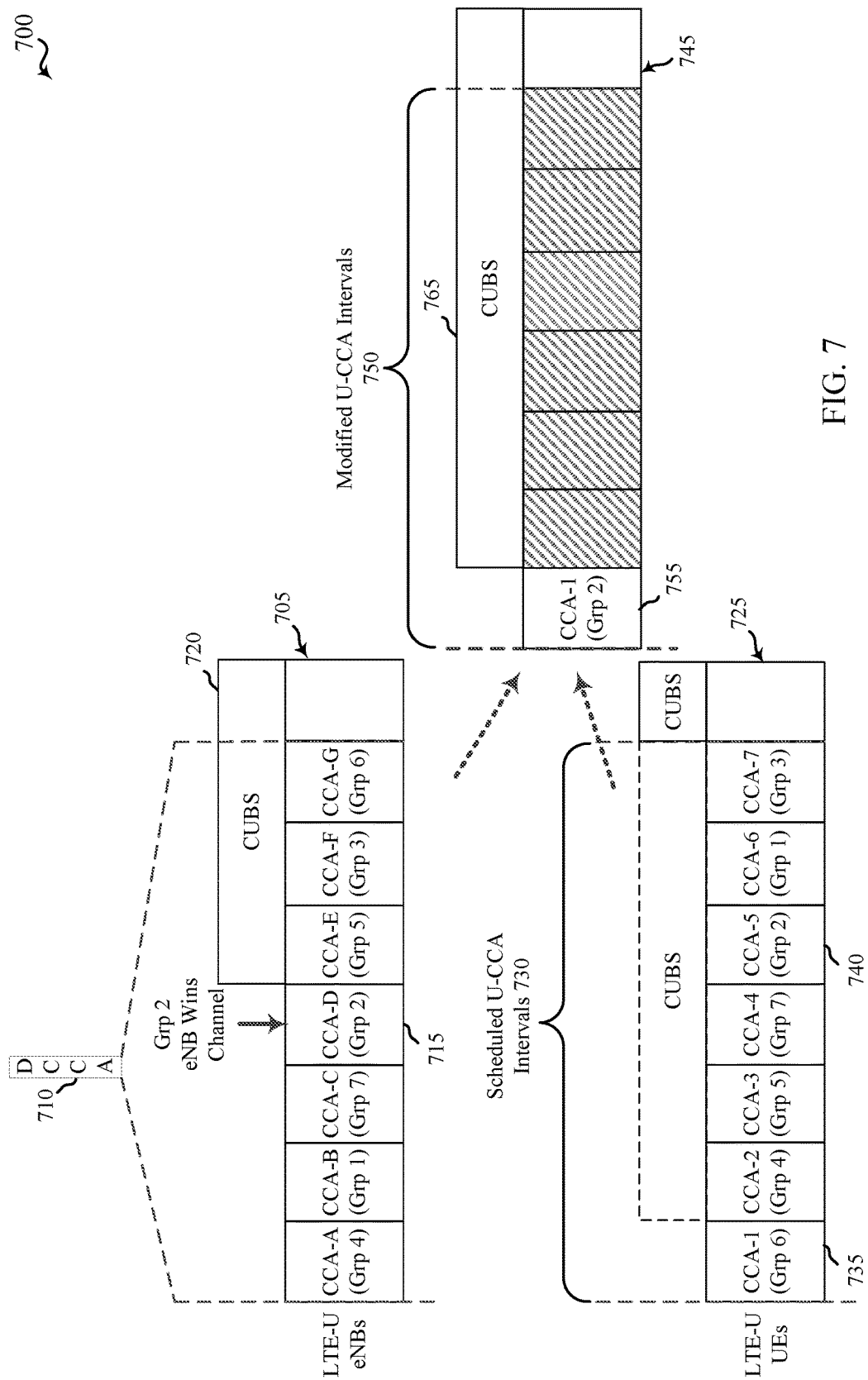
FIG. 7 illustrates another example of modified uplink CCA intervals based on a base station that wins channel access, according to various embodiments.

FIG. 7 illustrates an example 700 of contention-based channel access and modifications that may be made to contention-based procedures according to various embodiments. In example 700, base stations may perform a D-CCA 710 during a D-CCA 710 portion of an S' subframe 705, which may be an example of S' subframe 435 of FIG. 4. Similarly, UEs may have scheduled U-CCA intervals 730 during a U-CCA portion of an S subframe 725, which may be an example of S subframe 430 of FIG. 4. In some embodiments, portions of example 700 may be carried out by one or more of the base stations 105, 205, 305 and/or UEs 115, 215, 315 described with reference to FIGS. 1, 2, and/or 3.

During D-CCA 710, base stations of up to seven group ids (Grp 1 through Grp 7 of FIG. 7), may be mapped to CCA time intervals indicated as CCA-A through CCA-G in FIG. 7. As discussed above, depending upon the results of the mapping function, different group ids may occupy different CCA intervals. In this example, group id 4 occupies CCA-A, group id 1 occupies CCA-B, group id 7 occupies CCA-C, group id 2 occupies CCA-D, group id 5 occupies CCA-E, group id 3 occupies CCA-F, and group id 6 occupies CCA-G. In this example a base station with group id 2 wins the channel, as indicated at 715, with the base station then transmitting a CUBS 720 for the reminder of the subframe 705.

UEs within the coverage area of the base station that won the channel may receive the CUBS 720 and determine that the particular base station of group id 2 won the channel either through information included in a payload of the CUBS 720, or by determining that the CUBS 720 was transmitted starting immediately following the CCA interval CCA-D that is associated with group id 2 based on the mapping function. As discussed above, UEs may have CCA mapping functions that may be used to determine CCA time intervals for performing a U-CCA. In the example of FIG. 7, scheduled U-CCA intervals 730 (designated as CCA-1 through CCA-7) may be determined according to such a mapping function, with CCA-1 through CCA-7 mapped to, respectively, group ids 6, 4, 5, 7, 2, 1, and 3. As noted above, in this example a base station of group id 2 won downlink channel contention, and thus it would be desirable for a UE in group id 2 to also win uplink channel contention. The chances of such a result may be increased if a UE of group id 2 were allowed to perform a U-CCA during CCA-1 735. However, according to the mapping function, CCA-1 is occupied by group id 6, as indicated at 735, and CCA-5 is occupied by group id 2, as indicated at 740.

According to some embodiments, a UE of group id 2 may be favored to gain access to the channel through a modification of the mapping function that generates modified U-CCA intervals 750. In this embodiment, UEs with group id 2 may be favored by providing such UEs with the first U-CCA time interval 755, and deferring a U-CCA for UEs having different group ids. Of course, it will be readily understood that the particular example of FIG. 6 is provided for illustration and discussion purposes, and numerous different examples will be readily recognized by one of skill in the art.

In such embodiments, uplink contention among UEs is thus gated by the outcome of downlink contention, and a UE contends on the uplink during a LBT frame only if a base station of the same deployment (or alternatively, only if its own serving base station) won contention earlier in the LBT frame. This prevents other UEs with other group-ids from pre-empting a UE that is trying to respond to an uplink grant, or a downlink packet.

Figure 8:
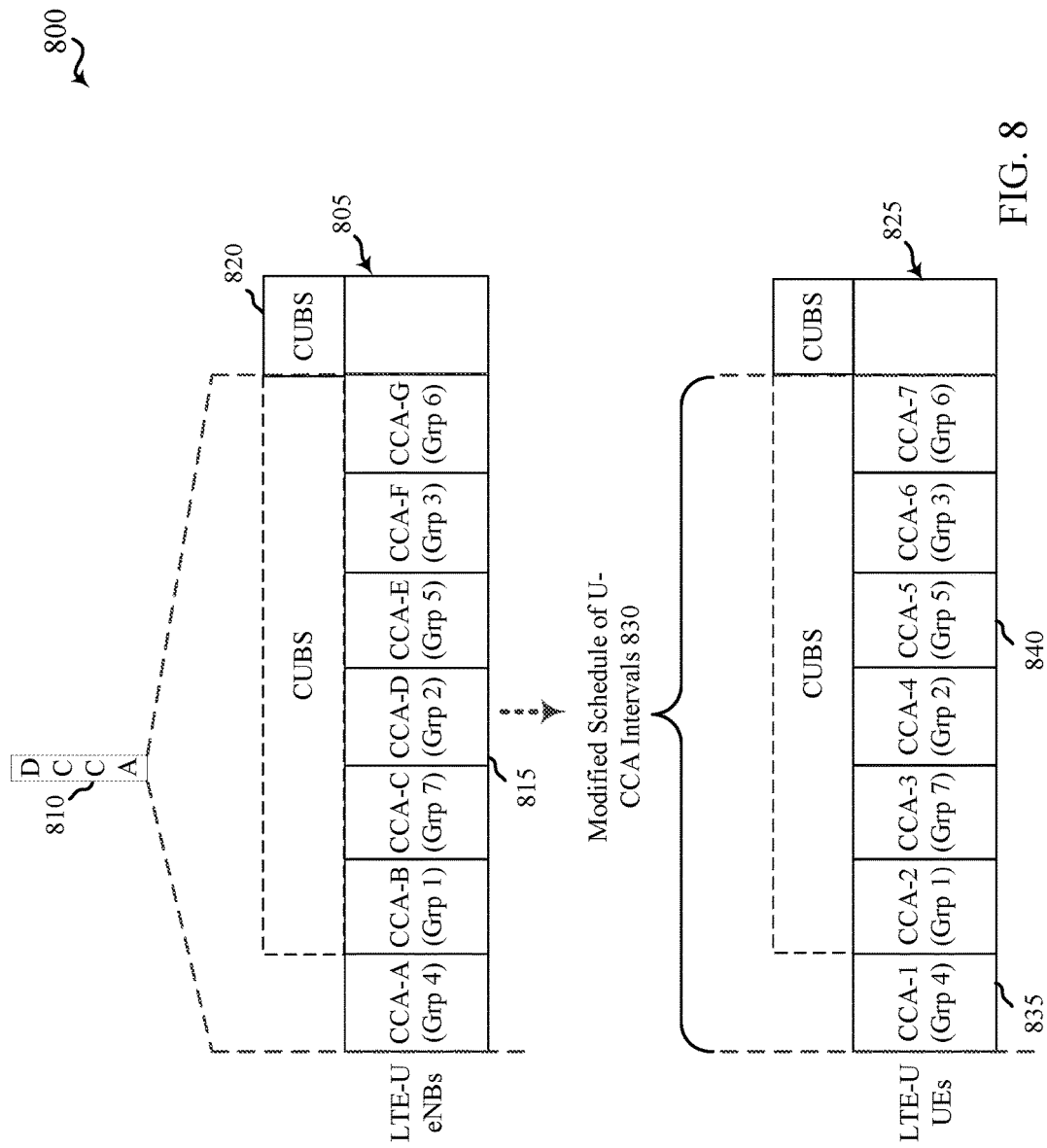
FIG. 8 illustrates an example of modified uplink CCA intervals based on a configuration of base station CCA intervals, according to various embodiments.

FIG. 8 illustrates an example 800 of contention-based channel access and modifications that may be made to contention-based procedures according to various embodiments. In example 800, base stations may perform a D-CCA 810 during a D-CCA 810 portion of an S' subframe 805, which may be an example of S' subframe 435 of FIG. 4. Similarly, UEs may have scheduled U-CCA intervals 830 during a U-CCA portion of an S subframe 825, which may be an example of S subframe 430 of FIG. 4. In some embodiments, portions of example 800 may be carried out by one or more of the base stations 105, 205, 305 and/or UEs 115, 215, 315 described with reference to FIGS. 1, 2, and/or 3.

During D-CCA 810, base stations of up to seven group ids (Grp 1 through Grp 7 of FIG. 8), may be mapped to CCA time intervals indicated as CCA-A through CCA-G in FIG. 8. As discussed above, depending upon the results of the mapping function, different group ids may occupy different CCA intervals. In this example, group id 4 occupies CCA-A, group id 1 occupies CCA-B, group id 7 occupies CCA-C, group id 2 occupies CCA-D, group id 5 occupies CCA-E, group id 3 occupies CCA-F, and group id 6 occupies CCA-G. In this example, a base station with group id 2 wins the channel, as indicated at 815, with the base station then transmitting a CUBS 820 for the reminder of the subframe 805.

UEs, according to such embodiments, may have CCA mapping functions that may be used to determine CCA time intervals for performing a U-CCA. In the example of FIG. 8, UEs may use modified scheduled U-CCA intervals 830 (designated as CCA-1 through CCA-7) that may be determined to corresponding with the order of the group ids of the D-CCA 810. Thus, in such embodiments, CCA-1 through CCA-7 may be mapped to, respectively, group ids 4, 1, 7, 2, 5, 3, and 6. As noted above, in this example a base station of group id 2 won downlink channel contention, and thus it would be desirable for a UE in group id 2 to also win uplink channel contention. The chances of such a result may be increased based on the group ids ahead of group id 2 not winning the channel in the D-CCA 810, and therefore it is likely that the UEs of the same group ids would not perform a U-CCA.

In some embodiments, a base station may contends for the downlink channel whenever it expects critical uplink data from a UE during that uplink portion of the LBT frame. If the base station wins contention, then its downlink CCA-interval will likely have occurred early enough to prevent other loaded base stations from winning the channel, and the same CCA-mapping function used for uplink contention also makes it likely corresponding UEs will be able to secure the uplink channel before other UEs.

Figure 9:
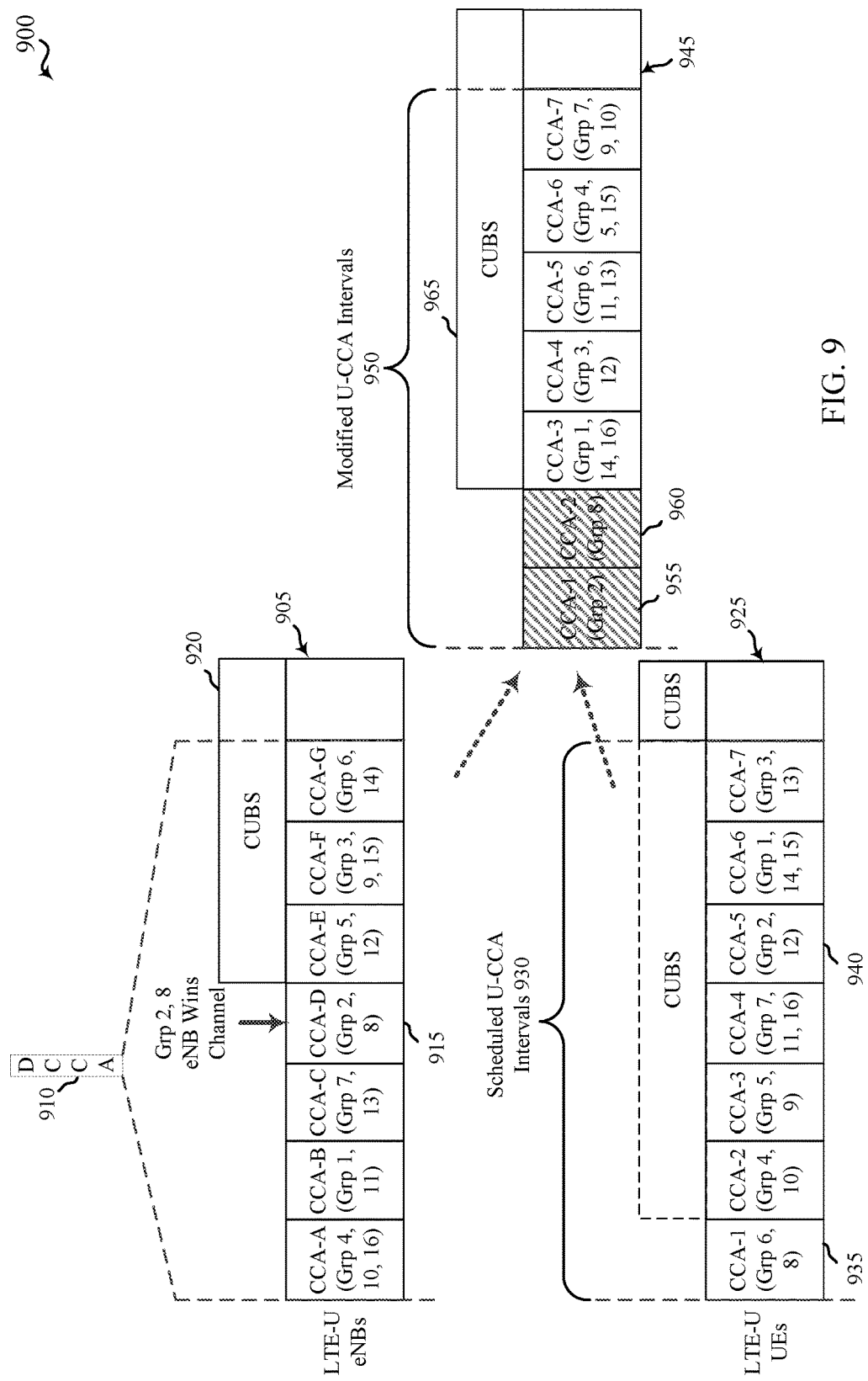
FIG. 9 illustrates an example of modified uplink CCA intervals based on a group of base stations having a base station that wins channel access, according to various embodiments.

While the above examples are described with respect to orthogonal CCA mapping, similar principles apply to non-orthogonal mapping functions. FIG. 9 illustrates an example 900 of contention-based channel access and modifications that may be made to contention-based procedures with non-orthogonal mapping functions according to various embodiments. In example 900, base stations may perform a D-CCA 910 during a D-CCA 910 portion of an S' subframe 905, which may be an example of S' subframe 435 of FIG. 4. Similarly, UEs may have scheduled U-CCA intervals 930 during a U-CCA portion of an S subframe 925, which may be an example of S subframe 430 of FIG. 4. In some embodiments, portions of example 900 may be carried out by one or more of the base stations 105, 205, 305 and/or UEs 115, 215, 315 described with reference to FIGS. 1, 2, and/or 3.

During D-CCA 910, base stations of up to 16 group ids (Grp 1 through Grp 16 of FIG. 9), may be mapped to CCA time intervals indicated as CCA-A through CCA-G in FIG. 9. As discussed above, depending upon the results of the mapping function, different group ids may occupy different CCA intervals. In this example, group ids 4, 10, and 16 occupy CCA-A, group ids 1 and 11 occupy CCA-B, group ids 7 and 13 occupy CCA-C, group ids 2 and 8 occupy CCA-D, group ids 5 and 12 occupy CCA-E, group ids 3, 9, and 15 occupy CCA-F, and group ids 6 and 14 occupy CCA-G. In this example, a base station with group id 2 wins the channel, as indicated at 915, with the base station then transmitting a CUBS 920 for the reminder of the subframe 905.

UEs within the coverage area of the base station that won the channel may receive the CUBS 920 and determine that the particular base station that occupied D-CCA interval 915 won the channel either through information included in a payload of the CUBS 920, or by determining that the CUBS 920 was transmitted starting immediately following the CCA interval CCA-D. This D-CCA interval may be determined to be associated with group ids 2 and 8.

As discussed above, UEs may have CCA mapping functions that may be used to determine CCA time intervals for performing a U-CCA. In the example of FIG. 9, scheduled U-CCA intervals 930 (designated as CCA-1 through CCA-7) may be determined according to such a mapping function. As noted above, in this example a base station of group id 2 won downlink channel contention, and thus it would be desirable for a UE in group id 2 to also win uplink channel contention. The chances of such a result may be increased if a UE of group id 2 were allowed to perform a U-CCA during CCA-1 935. However, according to the mapping function, CCA-1 is occupied by group ids 6 and 8, as indicated at 935, and CCA-5 is occupied by group ids 2 and 12, as indicated at 940.

According to some embodiments, a UE of group ids 2 and 8 may be favored to gain access to the channel through a modification of the mapping function that generates modified U-CCA intervals 950. In this embodiment, UEs with group ids 2 and 8 may be favored by providing such UEs with the first available U-CCA time intervals 955 and 960. Of course, it will be readily understood that the particular example of FIG. 6 is provided for illustration and discussion purposes, and numerous different examples will be readily recognized by one of skill in the art.

In such embodiments, the mapping function for the UEs may be modified based on the group ids of the D-CCA interval that won the channel. In some embodiments, the U-CCA mapping function may be statistically modified upon a successful D-CCA. Here, let $G_A(t)$ denote the set of all deployment-group-ids which won the downlink channel contention at frame t. Note that due to non-orthogonal CCA-mapping, the set $G_A(t)$ may have more than one group-id. The uplink CCA-mapping function may then be modified as follows:

$$F_U^{mod}(g, t) = \begin{cases} R_{1,N}(g, t) & \text{if } g \in G_A(t) \\ R_{N+1,7}(g, t) & \text{otherwise} \end{cases}$$

where $N \in \{1,2,3,4,5,6,7\}$ is a configuration parameter, based on the expected size of the set $G_A(t)$. The choice N=1 corresponds to the case where all UEs whose serving base station won downlink contention contend for the uplink channel in the very first CCA interval (note that $R_{1,1}(g,t)=1$), before all other UEs. In such a manner, the U-CCA intervals 950 are partitioned between successful and unsuccessful D-CCA attempts, with UEs served by successful base stations going first. Additionally or alternatively, only the sequences with success in a D-CCA may be modified while other sequences are unmodified, according to:

$$F_U^{mod}(g, t) = \begin{cases} R_{1,N}(g, t) & \text{if } g \in G_A(t) \\ F_U(g, t) & \text{otherwise} \end{cases}$$

which allows higher probability of deployments without D-CCA success to win the uplink contention.

Figure 10A:
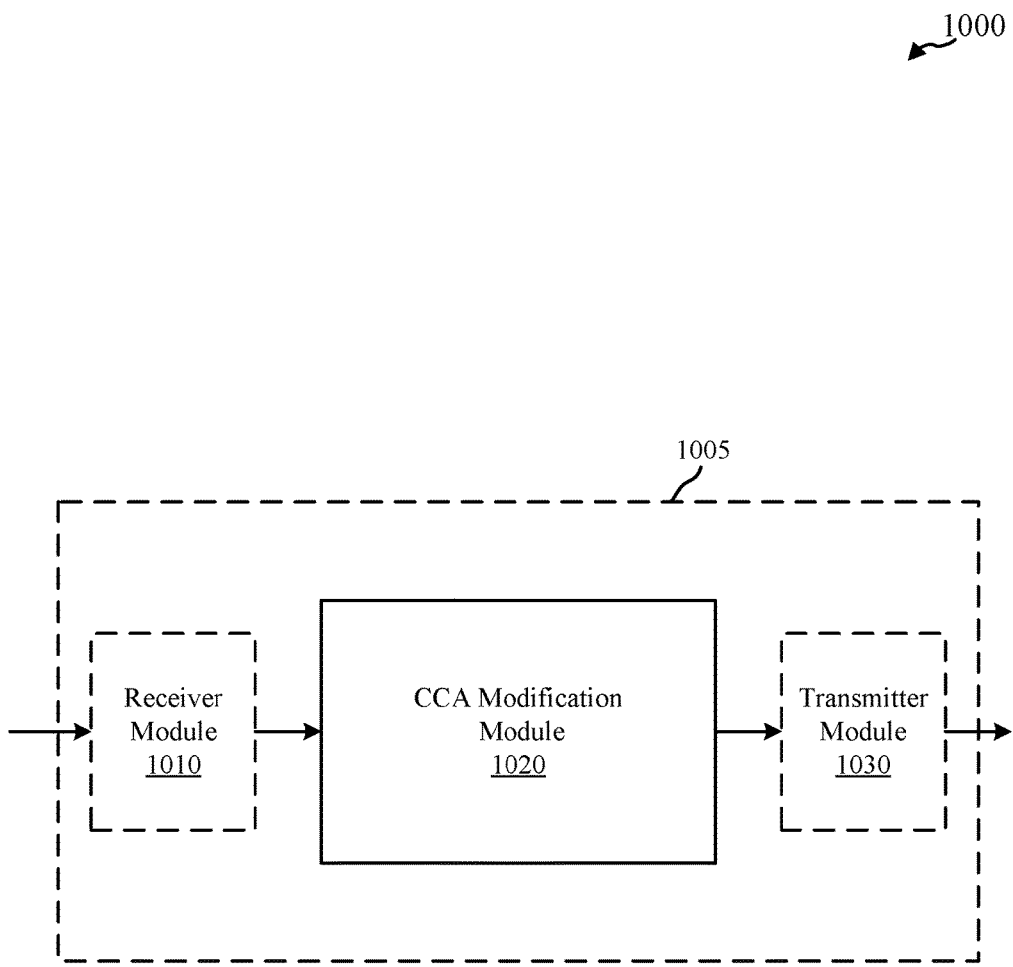
FIGS. 10A and 10B show block diagrams of examples of devices, such as base stations or UEs, for use in wireless communications according to various embodiments.

Referring now to FIG. 10A, a block diagram 1000 illustrates a device 1005 for use in wireless communications in accordance with various embodiments. In some embodiments, the device 1005 may be an example of one or more aspects of the base stations 105, 205, 305, and/or UEs 115, 215, 315 described with reference to FIGS. 1, 2, and/or 3. The device 1005 may also be a processor. The device 1005 may include a receiver module 1010, a CCA modification module 1020, and/or a transmitter module 1030. Each of these components may be in communication with each other.

The components of the device 1005 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 1010 may be or include a radio frequency (RF) receiver, such as an RF receiver operable to receive transmissions in a licensed spectrum and/or an unlicensed spectrum. The receiver module 1010 may be used to receive various types of data and/or control signals (i.e., transmissions) over one or more communication links of a wireless communications system including the licensed and unlicensed spectrums, such as one or more communication links of the wireless communications system 100, 200, and/or 300 described with reference to FIGS. 1, 2, and/or 3.

In some embodiments, the transmitter module 1030 may be or include an RF transmitter, such as an RF transmitter operable to transmit in the licensed spectrum and/or the unlicensed spectrum. The transmitter module 1030 may be used to transmit various types of data and/or control signals (i.e., transmissions) over one or more communication links of a wireless communications system, such as one or more communication links of the wireless communications system 100, 200, and/or 300 described with reference to FIGS. 1, 2, and/or 3.

In some embodiments, the CCA modification module 1020 may configure and/or perform a CCA according to a mapping function that is modified based on a base station that won downlink contention. When the CCA modification module 1020 determines that the unlicensed spectrum is to be used in communications, downlink CCAs may be monitored to determine a base station that won channel contention. An uplink CCA procedure may then be modified such that UEs associated with the base station that won the downlink channel will be favored to win the uplink channel, such as described above with respect to FIGS. 4-9, for example.

Figure 10B:
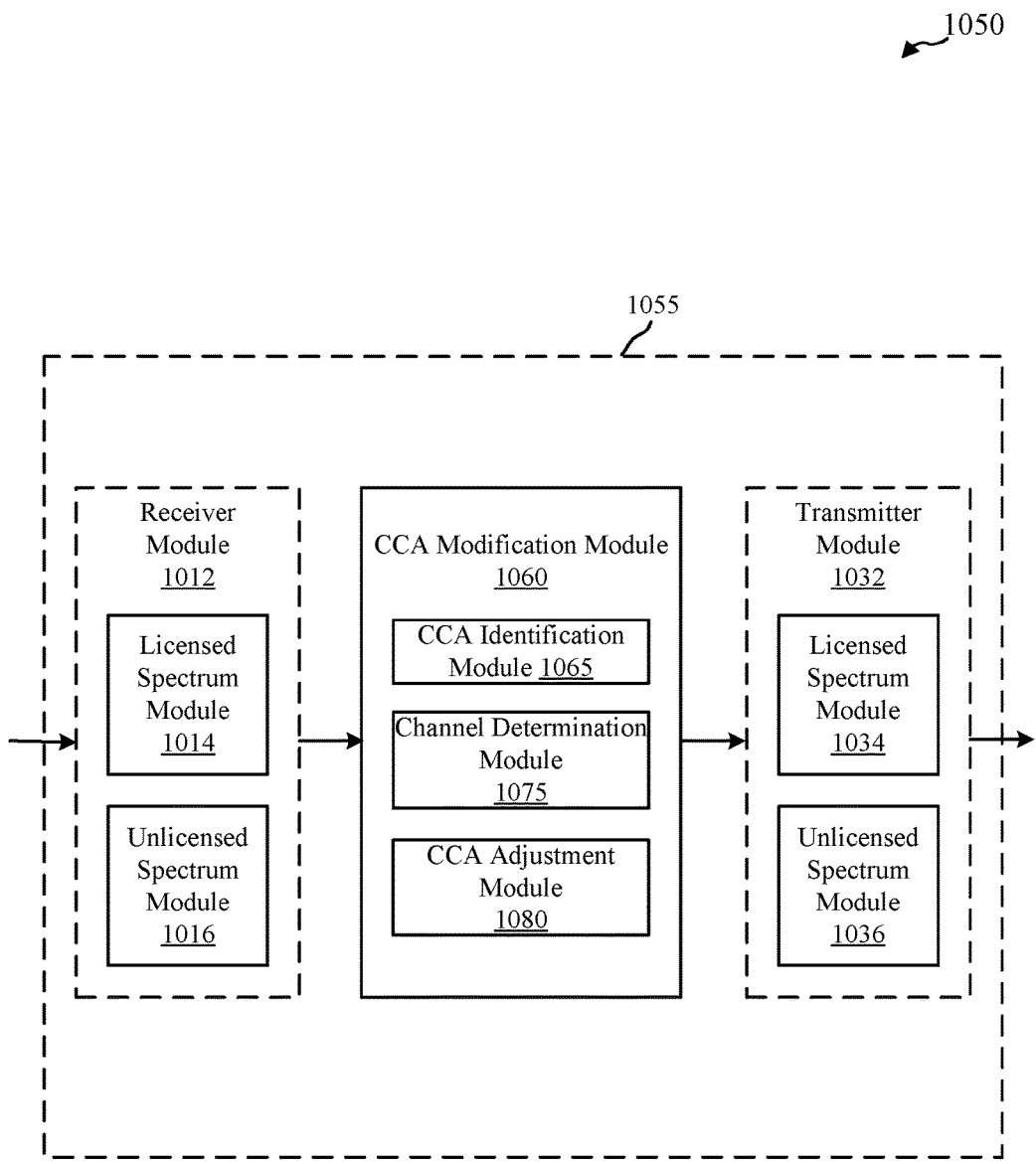

Referring now to FIG. 10B, a block diagram 1050 illustrates a device 1055 for use in wireless communications in accordance with various embodiments. In some embodiments, the device 1005 may be an example of one or more aspects of the base stations 105, 205, 305 and/or UEs 115, 215, 315 described with reference to FIGS. 1, 2 and/or 3. The device 1005 may also be a processor. The device 1055 may include a receiver module 1012, a CCA modification module 1060, and/or a transmitter module 1032. Each of these components may be in communication with each other.

The components of the device 1055 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 1012 may be an example of the receiver module 1010 of FIG. 10A. The receiver module 1012 may be or include a radio frequency (RF) receiver, such as an RF receiver operable to receive transmissions in a licensed spectrum and/or an unlicensed spectrum. The RF receiver may include separate receivers for the licensed spectrum and the unlicensed spectrum. The separate receivers may in some cases take the form of a licensed spectrum module 1014 and an unlicensed spectrum module 1016. The receiver module 1012, including the licensed spectrum module 1014 and the unlicensed spectrum module 1016, may be used to receive various types of data and/or control signals (i.e., transmissions) over one or more communication links of a wireless communications system including the licensed and unlicensed spectrums, such as one or more communication links of the wireless communications system 100, 200 and/or 300 described with reference to FIGS. 1, 2 and/or 3.

In some embodiments, the transmitter module 1032 may be an example of the transmitter module 1030 of FIG. 10A. The transmitter module 1032 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of a licensed spectrum module 1034 and an unlicensed spectrum module 1036. The transmitter module 1032 may be used to transmit various types of data and/or control signals (i.e., transmissions) over one or more communication links of a wireless communications system, such as one or more communication links of the wireless communications system 100, 200 and/or 300 described with reference to FIGS. 1, 2 and/or 3.

The CCA modification module 1060 may be an example of the CCA modification module 1020 described with reference to FIG. 10A and may include a CCA identification module 1065, a channel determination module 1075, and/or a CCA adjustment module 1080. Each of these components may be in communication with each other.

In some embodiments, the CCA identification 1065 may perform CCA mapping to determine CCA intervals during a special subframe that are to be used by devices for performing CCAs. The CCAs may be performed during a special subframe identified for a communications channel transmitted over the unlicensed spectrum. A device that won channel contention may be determined by channel determination module 1075, based on monitoring a CUBS that may be transmitted by a base station when the base station wins a channel.

In some embodiments, the CCA adjustment module 1080 may modify a CCA mapping function based on a group id of a device that won channel contention as identified by the channel determination module 1075. The CCA intervals for performing a CCA by devices may be modified such that UEs associated with the base station that won the downlink channel will be favored to win the uplink channel, such as described above with respect to FIGS. 4-9, for example.

Figure 11:
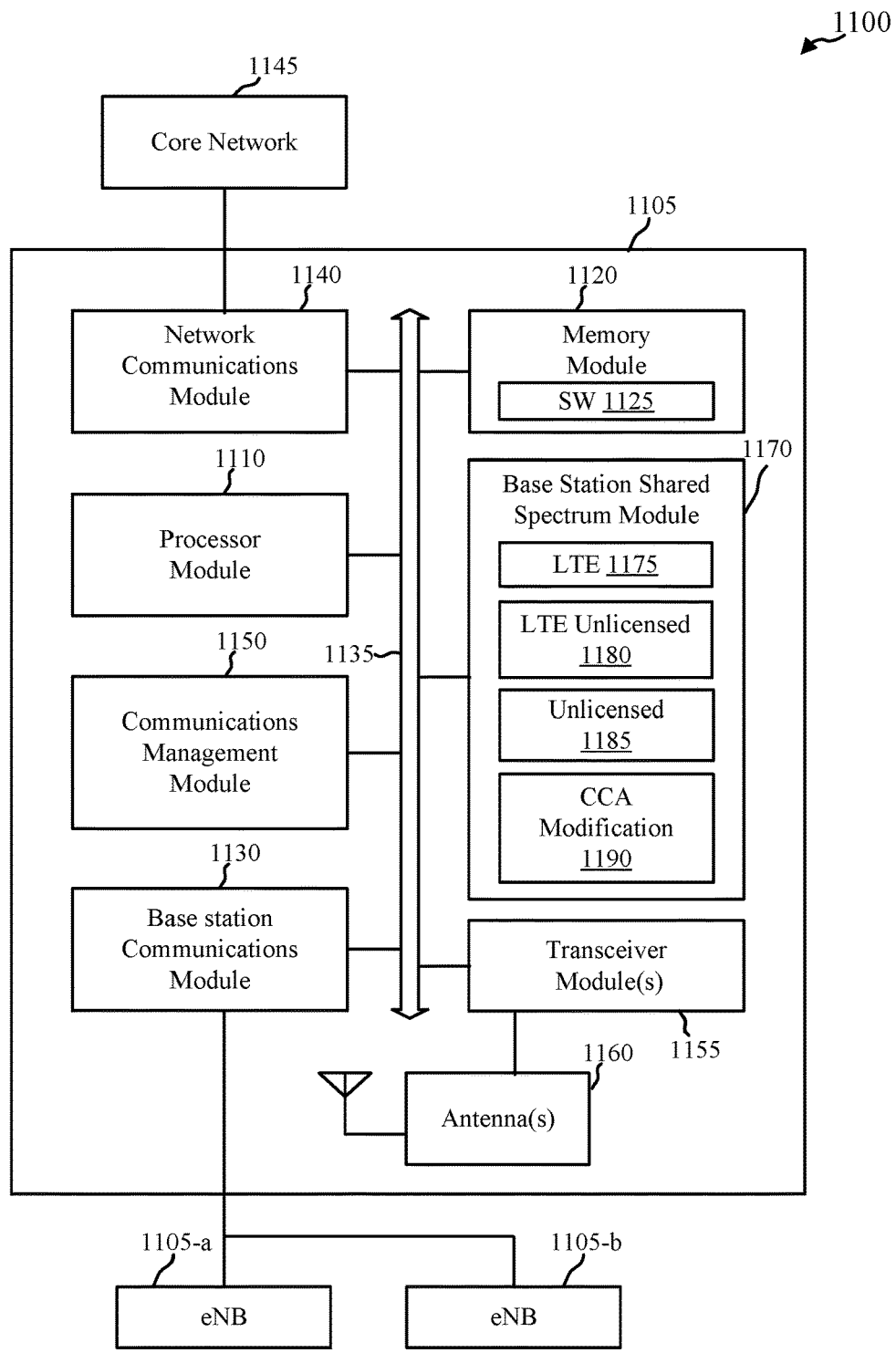
FIG. 11 shows a block diagram that illustrates an example of a base station architecture according to various embodiments.

Turning to FIG. 11, a block diagram 1100 is shown that illustrates a base station 1105 configured for LTE communications over an unlicensed spectrum. In some embodiments, the base station 1105 may be an example of one or more aspects of the base stations or devices 105, 205, 305, 1005, and/or 1055 described with reference to FIGS. 1, 2, 3, 10A, and/or 10B. The base station 1105 may be configured to implement at least some of the CCA coordination features and functions described with respect to FIGS. 1, 2, 3, 4A, 4B, 5, 6, 7, 8, 9, 10A, and/or 10B. The base station 1105 may include a processor module 1110, a memory module 1120, at least one transceiver module (represented by transceiver module(s) 1155), at least one antenna (represented by antenna(s) 1160), and/or a base station shared spectrum module 1170. The base station 1105 may also include one or both of a base station communications module 1130 and a network communications module 1140. Each of these components may be in communication with each other, directly or indirectly, over one or more buses 1135.

The memory module 1120 may include random access memory (RAM) and/or read-only memory (ROM). The memory module 1120 may store computer-readable, computer-executable software (SW) code 1125 containing instructions that are configured to, when executed, cause the processor module 1110 to perform various functions described herein for using LTE-based communications in a licensed and/or unlicensed spectrum, including the performance of CCA and/or modification or signaling of modified CCA mapping functions that are to be implemented by one or more UEs. Alternatively, the software code 1125 may not be directly executable by the processor module 1110 but be configured to cause the base station 1105, e.g., when compiled and executed, to perform various of the functions described herein.

The processor module 1110 may include an intelligent hardware device, e.g., a central processing unit (CPU), a microcontroller, an ASIC, etc. The processor module 1110 may process information received through the transceiver module(s) 1155, the base station communications module 1130, and/or the network communications module 1140. The processor module 1110 may also process information to be sent to the transceiver module(s) 1155 for transmission through the antenna(s) 1160, to the base station communications module 1130 for transmission to one or more other base stations or eNBs 1105-*a* and 1105-*b*, and/or to the network communications module 1140 for transmission to a core network 1145, which may be an example of aspects of the core network 130 described with reference to FIG. 1. The processor module 1110 may handle, alone or in connection with the base station shared spectrum module 1170, various aspects of using LTE-based communications in a licensed and/or unlicensed spectrum, including the performance of CCA and/or modification or signaling of modified CCA mapping functions that may be used to modify channel access procedures, such as described above.

The transceiver module(s) 1155 may include a modem configured to modulate packets and provide the modulated packets to the antenna(s) 1160 for transmission, and to demodulate packets received from the antenna(s) 1160. The transceiver module(s) 1155 may be implemented as one or more transmitter modules and one or more separate receiver modules. The transceiver module(s) 1155 may support communications in at least one licensed spectrum and in at least one unlicensed spectrum. The transceiver module(s) 1155 may be configured to communicate bi-directionally, via the antenna(s) 1160, with one or more of the UEs or devices 115, 215, and/or 315 described with reference to FIGS. 1, 2, and/or 3, for example. The base station 1105 may typically include multiple antennas 1160 (e.g., an antenna array). The base station 1105 may communicate with the core network 1145 through the network communications module 1140. The base station 1105 may communicate with other base stations or eNBs, such as the eNBs 1105-*a* and 1105-*b*, using the base station communications module 1130.

According to the architecture of FIG. 11, the base station 1105 may further include a communications management module 1150. The communications management module 1150 may manage communications with other base stations, eNBs, and/or devices. The communications management module 1150 may be in communication with some or all of the other components of the base station 1105 via the bus or buses 1135. Alternatively, functionality of the communications management module 1150 may be implemented as a component of the transceiver module(s) 1155, as a computer program product, and/or as one or more controller elements of the processor module 1110.

The base station shared spectrum module 1170 may be configured to perform and/or control some or all of the base station functions or aspects described with reference to FIGS. 1, 2, 3, 4A, 4B, 5, 6, 7, 8, 9, 10A, and/or 10B related to using LTE-based communications in a licensed and/or unlicensed spectrum. For example, the base station shared spectrum module 1170 may be configured to support CCA operations according to a CCA mapping function or a modified CCA mapping function. The base station shared spectrum module 1170 may include an LTE module 1175 configured to handle LTE communications, an LTE unlicensed module 1180 configured to handle LTE communications and CCA in an unlicensed spectrum, and/or an unlicensed module 1185 configured to handle communications other than LTE communications in an unlicensed spectrum. The base station shared spectrum module 1170 may also include a CCA modification module 1190 configured to provide, for example, any of the CCA coordination and/or modification functions described with reference to FIGS. 1, 2, 3, 4A, 4B, 5, 6, 7, 8, 9, 10A and/or 10B. The CCA modification module 1190 may be an example of similar modules (e.g., module 1020 and/or module 1060) described with reference to FIGS. 10A and/or 10B. The base station shared spectrum module 1170, or portions of it, may include a processor and/or some or all of the functionality of the base station shared spectrum module 1170 may be performed by the processor module 1110 and/or in connection with the processor module 1110.

Figure 12:
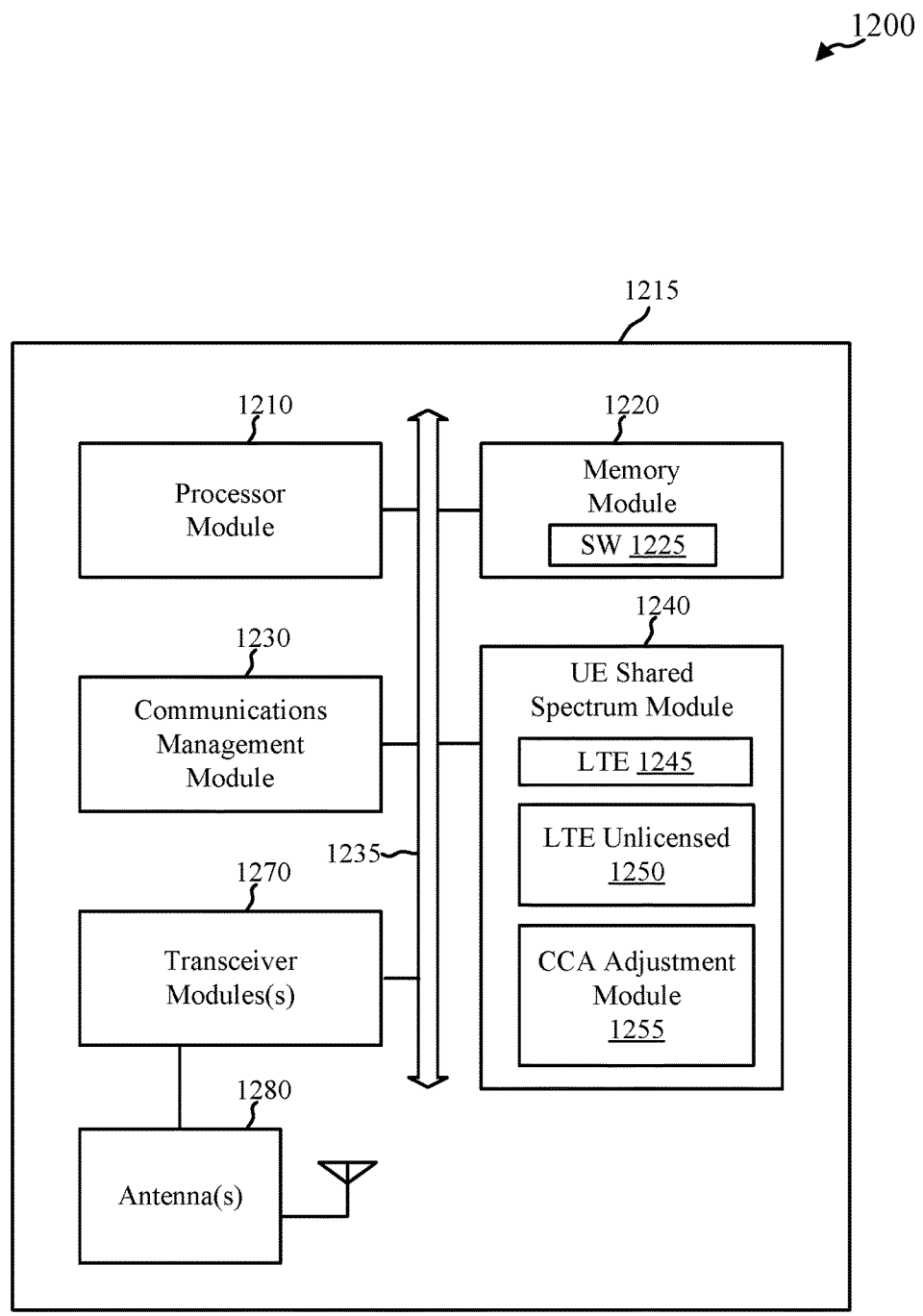
FIG. 12 shows a block diagram that illustrates an example of a UE architecture according to various embodiments.

Turning to FIG. 12, a block diagram 1200 is shown that illustrates a UE 1215 configured for LTE/LTE-A over an unlicensed spectrum. The UE 1215 may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 1215 may have an internal power supply (not shown), such as a small battery, to facilitate mobile operation. In some embodiments, the UE 1215 may be an example of one or more of the UEs or devices 115, 215, 315, 1005, and/or 1055 described with reference to FIGS. 1, 2, 3, 10A, and/or 10B. The UE 1215 may be configured to communicate with one or more of the base stations or devices 105, 205, 305, 1005, 1055, and/or 1105 described with reference to FIGS. 1, 2, 3, 10A, 10B, and/or 11.

The UE 1215 may include a processor module 1210, a memory module 1220, at least one transceiver module (represented by transceiver module(s) 1270), at least one antenna (represented by antenna(s) 1280), and/or a UE shared spectrum module 1240. Each of these components may be in communication with each other, directly or indirectly, over one or more buses 1235.

The memory module 1220 may include RAM and/or ROM. The memory module 1220 may store computer-readable, computer-executable software (SW) code 1225 containing instructions that are configured to, when executed, cause the processor module 1210 to perform various functions described herein for using LTE-based communications in a licensed and/or unlicensed spectrum. Alternatively, the software code 1225 may not be directly executable by the processor module 1210 but be configured to cause the UE 1215 (e.g., when compiled and executed) to perform various of the UE functions described herein.

The processor module 1210 may include an intelligent hardware device, e.g., a CPU, a microcontroller, an ASIC, etc. The processor module 1210 may process information received through the transceiver module(s) 1270 and/or information to be sent to the transceiver module(s) 1270 for transmission through the antenna(s) 1280. The processor module 1210 may handle, alone or in connection with the UE shared spectrum module 1240, various aspects of using LTE-based communications in a licensed and/or unlicensed spectrum.

The transceiver module(s) 1270 may be configured to communicate bi-directionally with base stations. The transceiver module(s) 1270 may be implemented as one or more transmitter modules and one or more separate receiver modules. The transceiver module(s) 1270 may support communications in at least one licensed spectrum and in at least one unlicensed spectrum. The transceiver module(s) 1270 may include a modem configured to modulate packets and provide the modulated packets to the antenna(s) 1280 for transmission, and to demodulate packets received from the antenna(s) 1280. While the UE 1215 may include a single antenna, there may be embodiments in which the UE 1215 may include multiple antennas 1280.

According to the architecture of FIG. 12, the UE 1215 may further include a communications management module 1230. The communications management module 1230 may manage communications with various base stations or eNBs. The communications management module 1230 may be a component of the UE 1215 in communication with some or all of the other components of the UE 1215 over the one or more buses 1235. Alternatively, functionality of the communications management module 1230 may be implemented as a component of the transceiver module(s) 1270, as a computer program product, and/or as one or more controller elements of the processor module 1210.

The UE shared spectrum module 1240 may be configured to perform and/or control some or all of the UE functions or aspects described in FIGS. 1, 2, 3, 4A, 4B, 5, 6, 7, 8, 9, 10A, and/or 10B related to using LTE-based communications in a licensed and/or unlicensed spectrum. For example, the UE shared spectrum module 1240 may be configured to perform a CCA to gain channel access according to a CCA mapping function, or a modified CCA mapping function. The UE shared spectrum module 1240 may be configured to receive data frames on component carriers in which CCA subframes are transmitted and determine a base station that won channel access, and/or perform CCA operations according to CCA mapping determined based on a group id of a base station that won downlink channel access. The UE shared spectrum module 1240 may include an LTE module 1245 configured to handle LTE communications, an LTE unlicensed module 1250 configured to handle LTE communications in an unlicensed spectrum, and/or a CCA adjustment module 1255. The CCA adjustment module 1255 may be an example of similar modules (e.g., module 1020 and/or module 1060) described with reference to FIGS. 10A and/or 10B, and may coordinate CCA intervals for performance of CCA according to a mapping function or modified mapping function. The UE shared spectrum module 1240, or portions of it, may include a processor and/or some or all of the functionality of the UE shared spectrum module 1240 may be performed by the processor module 1210 and/or in connection with the processor module 1210.

Figure 13:
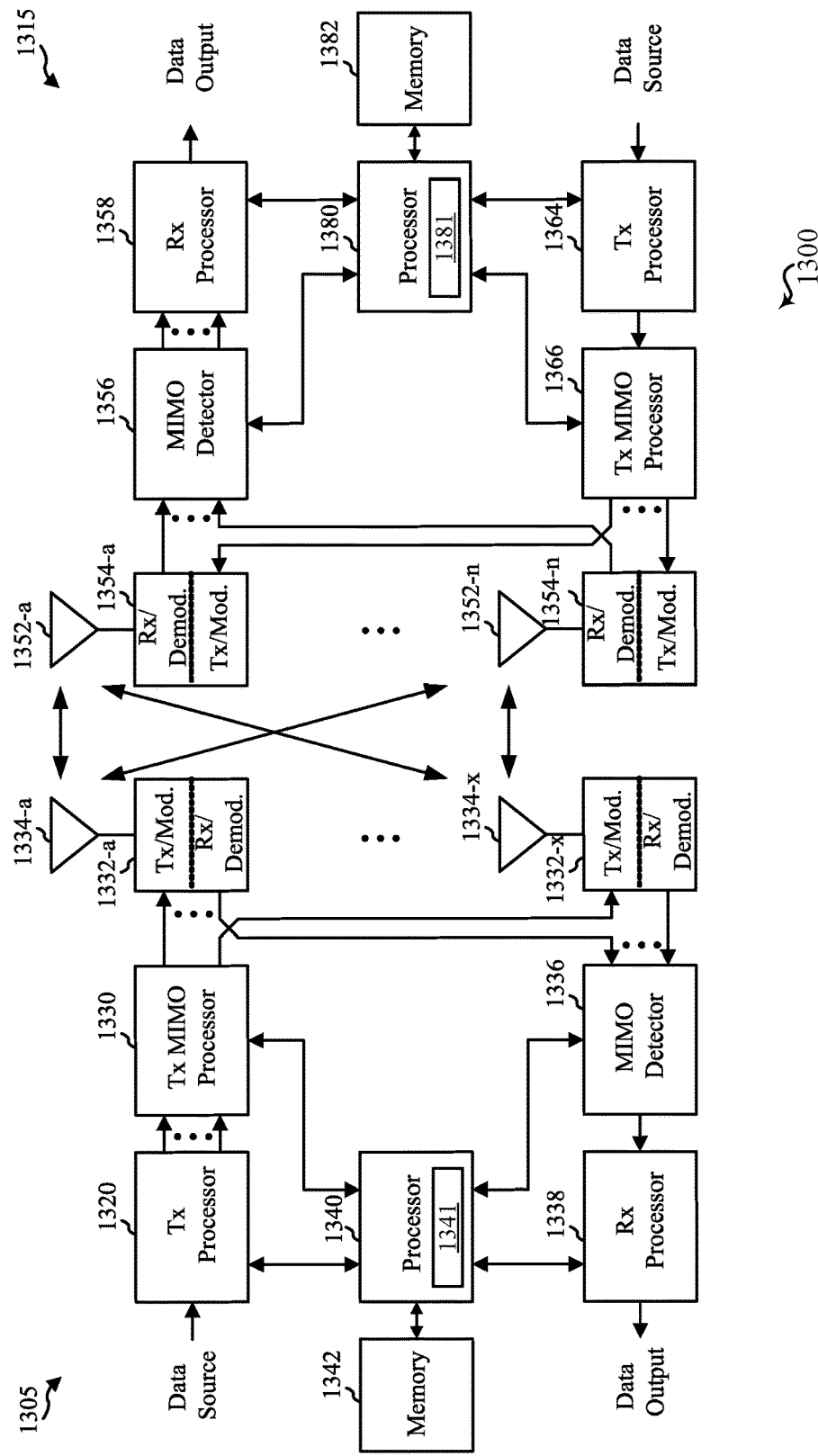
FIG. 13 shows a block diagram that illustrates an example of a multiple-input multiple-output (MIMO) communications system according to various embodiments.

Turning next to FIG. 13, a block diagram of a multiple-input multiple-output (MIMO) communication system 1300 is shown including a base station 1305 and a UE 1315. The base station 1305 and the UE 1315 may support LTE-based communications using a licensed and/or unlicensed spectrum. The base station 1305 may be an example of one or more aspects of the base stations or devices 105, 205, 305, 1005, 1055, and/or 1105 described with reference to FIGS. 1, 2, 3, 10A, 10B, and/or 11, while the UE 1315 may be an example of one or more aspects of the UEs or devices 115, 215, 315, 1005, 1055, and/or 1215 described with reference to FIGS. 1, 2, 3, 10A, 10B, and/or 12. The system 1300 may illustrate aspects of the wireless communications system 100, 200, and/or 300 described with reference to FIGS. 1, 2, and/or 3, and may perform a CCA for channel access to channels in an unlicensed spectrum such as described with reference to FIGS. 4-9.

The base station 1305 may be equipped with antennas 1334-a through 1334-x, and the UE 1315 may be equipped with antennas 1352-a through 1352-n. In the system 1300, the base station 1305 may be able to send data over multiple communication links at the same time. Each communication link may be called a "layer" and the "rank" of the communication link may indicate the number of layers used for communication. For example, in a 2×2 MIMO system where base station 1305 transmits two "layers," the rank of the communication link between the base station 1305 and the UE 1315 may be two.

At the base station 1305, a transmit (Tx) processor 1320 may receive data from a data source. The transmit processor 1320 may process the data. The transmit processor 1320 may also generate reference symbols and/or a cell-specific reference signal. A transmit (Tx) MIMO processor 1330 may perform spatial processing (e.g., precoding) on data symbols, control symbols, and/or reference symbols, if applicable, and may provide output symbol streams to the transmit (Tx) modulators 1332-a through 1332-x. Each modulator 1332 may process a respective output symbol stream (e.g., for OFDM, etc.) to obtain an output sample stream. Each modulator 1332 may further process (e.g., convert to analog, amplify, filter, and upconvert) the output sample stream to obtain a downlink (DL) signal. In one example, DL signals from modulators 1332-a through 1332-x may be transmitted via the antennas 1334-a through 1334-x, respectively.

At the UE 1315, the antennas 1352-a through 1352-n may receive the DL signals from the base station 1305 and may provide the received signals to the receive (Rx) demodulators 1354-*a* through 1354-*n*, respectively. Each demodulator 1354 may condition (e.g., filter, amplify, downconvert, and digitize) a respective received signal to obtain input samples. Each demodulator 1354 may further process the input samples (e.g., for OFDM, etc.) to obtain received symbols. A MIMO detector 1356 may obtain received symbols from all the demodulators 1354-*a* through 1354-*n*, perform MIMO detection on the received symbols if applicable, and provide detected symbols. A receive (Rx) processor 1358 may process (e.g., demodulate, deinterleave, and decode) the detected symbols, providing decoded data for the UE 1315 to a data output, and provide decoded control information to a processor 1380, or memory 1382. The processor 1380 may include a module or function 1381 that may perform various functions related to using LTE-based communications in a licensed and/or unlicensed spectrum. For example, the module or function 1381 may perform some or all of the functions of the CCA modification module 1020 or 1060 described with reference to FIG. 10A or 10B, and/or of the UE shared spectrum module 1240 described with reference to FIG. 12. In some embodiments, the module or function 1381 may be used to determine CCA timing for the UE 1315's transmission of CCAs during special subframes.

On the uplink (UL), at the UE 1315, a transmit (Tx) processor 1364 may receive and process data from a data source. The transmit processor 1364 may also generate reference symbols for a reference signal. The symbols from the transmit processor 1364 may be precoded by a transmit (Tx) MIMO processor 1366 if applicable, further processed by the transmit (Tx) modulators 1354-*a* through 1354-*n* (e.g., for SC-FDMA, etc.), and be transmitted to the base station 1305 in accordance with the transmission parameters received from the base station 1305. At the base station 1305, the UL signals from the UE 1315 may be received by the antennas 1334, processed by the receiver (Rx) demodulators 1332, detected by a MIMO detector 1336 if applicable, and further processed by a receive (Rx) processor 1338. The receive processor 1338 may provide decoded data to a data output and to the processor 1340. The processor 1340 may include a module or function 1341 that may perform various aspects related to using LTE-based communications in a licensed and/or unlicensed spectrum. For example, the module or function 1341 may perform some or all of the functions of the CCA modification module 1020 or 1060 described with reference to FIG. 10A or 10B, or the base station shared spectrum module 1170 described with reference to FIG. 11. In some embodiments, the module or function 1341 may be used to determine CCA timing for the base station 1305's transmission of CCAs during special subframes.

The components of the base station 1305 may, individually or collectively, be implemented with one or more ASICs adapted to perform some or all of the applicable functions in hardware. Each of the noted modules may be a means for performing one or more functions related to operation of the system 1300. Similarly, the components of the UE 1315 may, individually or collectively, be implemented with one or more ASICs adapted to perform some or all of the applicable functions in hardware. Each of the noted components may be a means for performing one or more functions related to operation of the system 1300.

Figure 14:
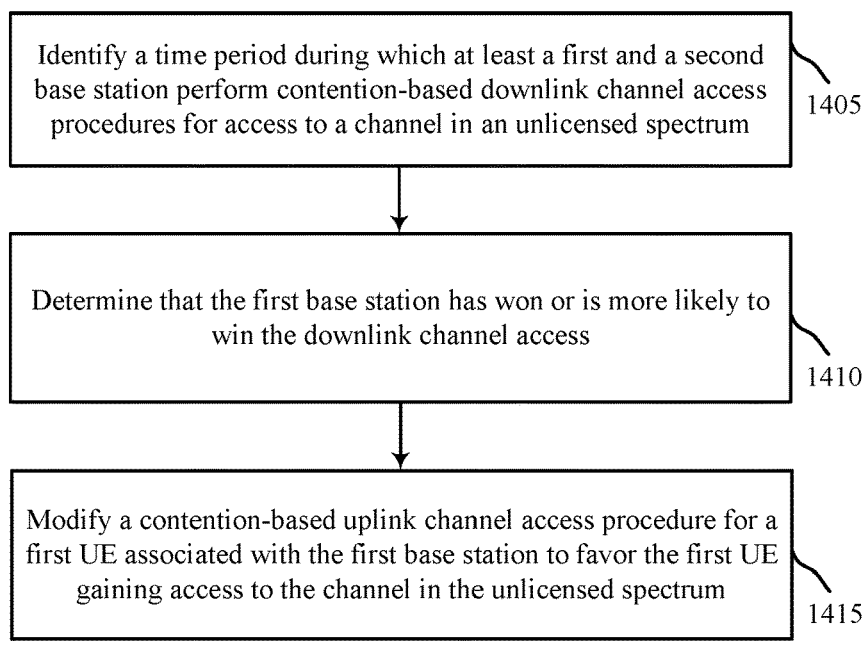
FIGS. 14 and 15 are flowcharts of examples of methods for wireless communications using unlicensed spectrum (e.g., at a UE) according to various embodiments.

FIG. 14 is a flowchart illustrating an example of a method 1400 for wireless communications. For clarity, the method 1400 is described below with reference to ones of the UEs or devices 115, 215, 315, 1005, 1055, 1215 and/or 1315 described with reference to FIGS. 1, 2, 3, 10A, 10B, 12, and/or 13. In one embodiment, a UE may execute one or more sets of codes to control the functional elements of the UE to perform the functions described below.

At block 1405, a time period is identified during which at least a first and a second base station perform contention-based downlink channel access procedures for access to a channel in an unlicensed spectrum. In some embodiments, the base stations may each have a group id, and a mapping function may determine a CCA interval during which each base station is to perform a CCA to attempt to obtain channel access. The operation(s) at block 1405 may in some cases be performed using the CCA modification module 1020 and/or 1060 described with reference to FIGS. 10A and/or 10B, CCA identification module 1065 described with reference to FIG. 10B, the UE shared spectrum module 1240 described with reference to FIG. 12, and/or the module or function 1381 described with reference to FIG. 13.

At block 1410, it is determined that the first base station has won or is more likely to win the downlink channel access. In some embodiments, a CUBS may be monitored and used to determine that the first base station has won the downlink channel access. The operation(s) at block 1410 may in some cases be performed using the CCA modification module 1020 and/or 1060 described with reference to FIGS. 10A and/or 10B, the channel determination module 1075 described with reference to FIG. 10B, the UE shared spectrum module 1240 described with reference to FIG. 12, and/or the module or function 1381 described with reference to FIG. 13.

At block 1415, a contention-based uplink channel access procedure for a first UE associated with the first base station is modified to favor the first UE gaining access to the channel in the unlicensed spectrum. Such modification may, according to some embodiments, swap a CCA interval associated with the first base station for an earliest available CCA interval. Such modification may, according to other embodiments, shift CCA intervals based on a number of CCA intervals between an earliest available CCA interval and a CCA interval associated with the first base station. In still other embodiments, a CCA interval associated with the first base station may be set to the earliest available CCA interval, and CCAs associated with other base stations may be deferred to a subsequent CCA period. The operation(s) at block 1415 may in some cases be performed using the CCA modification module 1020 and/or 1060 described with reference to FIGS. 10A and/or 10B, the CCA adjustment module 1080 described with reference to FIG. 10B, the UE shared spectrum module 1240 described with reference to FIG. 12, and/or the module or function 1381 described with reference to FIG. 13.

Thus, the method 1400 may provide for wireless communications in which a contention-based channel access procedure may be modified to favor a UE associated with a base station that has won downlink channel access. It should be noted that the method 1400 is just one implementation and that the operations of the method 1400 may be rearranged or otherwise modified such that other implementations are possible.

Figure 15:
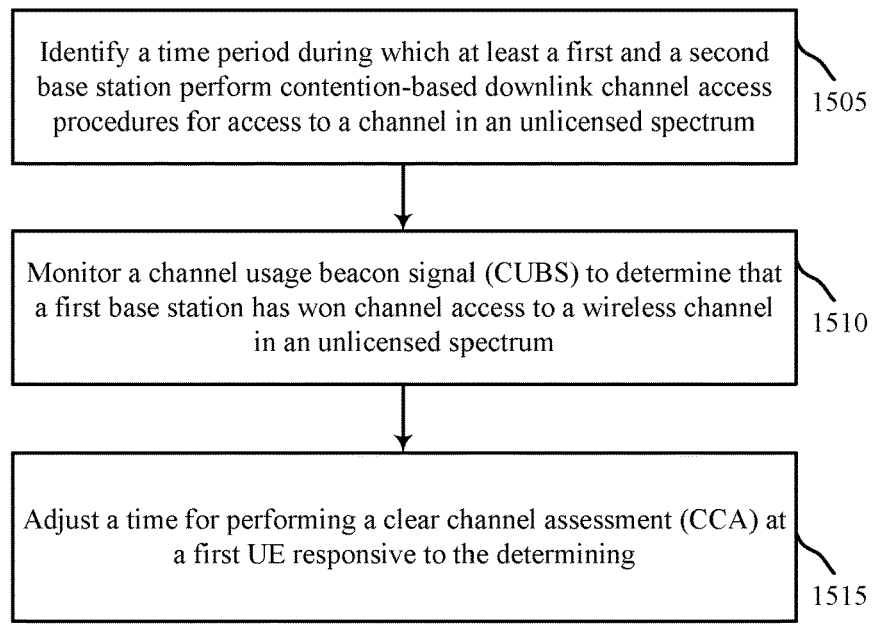

FIG. 15 is a flowchart illustrating an example of a method 1500 for wireless communications. For clarity, the method 1500 is described below with reference to ones of the UEs or devices 115, 215, 315, 1005, 1055, 1215 and/or 1315 described with reference to FIGS. 1, 2, 3, 10A, 10B, 12, and/or 13. In one embodiment, a UE may execute one or more sets of codes to control the functional elements of the UE to perform the functions described below.

At block 1505, a time period is identified during which at least a first and a second base station perform contention-based downlink channel access procedures for access to a channel in an unlicensed spectrum. In some embodiments, the base stations may each have a group id, and a mapping function may determine a CCA interval during which each base station is to perform a CCA to attempt to obtain channel access. The operation(s) at block 1505 may in some cases be performed using the CCA modification module 1020 and/or 1060 described with reference to FIGS. 10A and/or 10B, CCA identification module 1065 described with reference to FIG. 10B, the UE shared spectrum module 1240 described with reference to FIG. 12, and/or the module or function 1381 described with reference to FIG. 13.

At block 1510, a channel usage beacon signal (CUBS) may be monitored to determine that a first base station has won channel access to a wireless channel in an unlicensed spectrum. The operation(s) at block 1510 may in some cases be performed using the CCA modification module 1020 and/or 1060 described with reference to FIGS. 10A and/or 10B, the channel determination module 1075 described with reference to FIG. 10B, the UE shared spectrum module 1240 described with reference to FIG. 12, and/or the module or function 1381 described with reference to FIG. 13.

At block 1515, a time for performing a clear channel assessment (CCA) at a first UE is adjusted responsive to the determining. Such adjustment may, according to some embodiments, swap a CCA interval associated with the first base station for an earliest available CCA interval. Such adjustment may, according to other embodiments, shift CCA intervals based on a number of CCA intervals between an earliest available CCA interval and a CCA interval associated with the first base station. In still other embodiments, a CCA interval associated with the first base station may be set to the earliest available CCA interval, and CCAs associated with other base stations may be deferred to a subsequent CCA period. The operation(s) at block 1515 may in some cases be performed using the CCA modification module 1020 and/or 1060 described with reference to FIGS. 10A and/or 10B, the CCA adjustment module 1080 described with reference to FIG. 10B, the UE shared spectrum module 1240 described with reference to FIG. 12, and/or the module or function 1381 described with reference to FIG. 13.

Thus, the method 1500 may provide for wireless communications in which CCA operations may be modified to be performed at different times for a UE based on whether an associated base station has gained channel access to a wireless communication channel in an unlicensed spectrum. It should be noted that the method 1500 is just one implementation and that the operations of the method 1500 may be rearranged or otherwise modified such that other implementations are possible.

Figure 16:
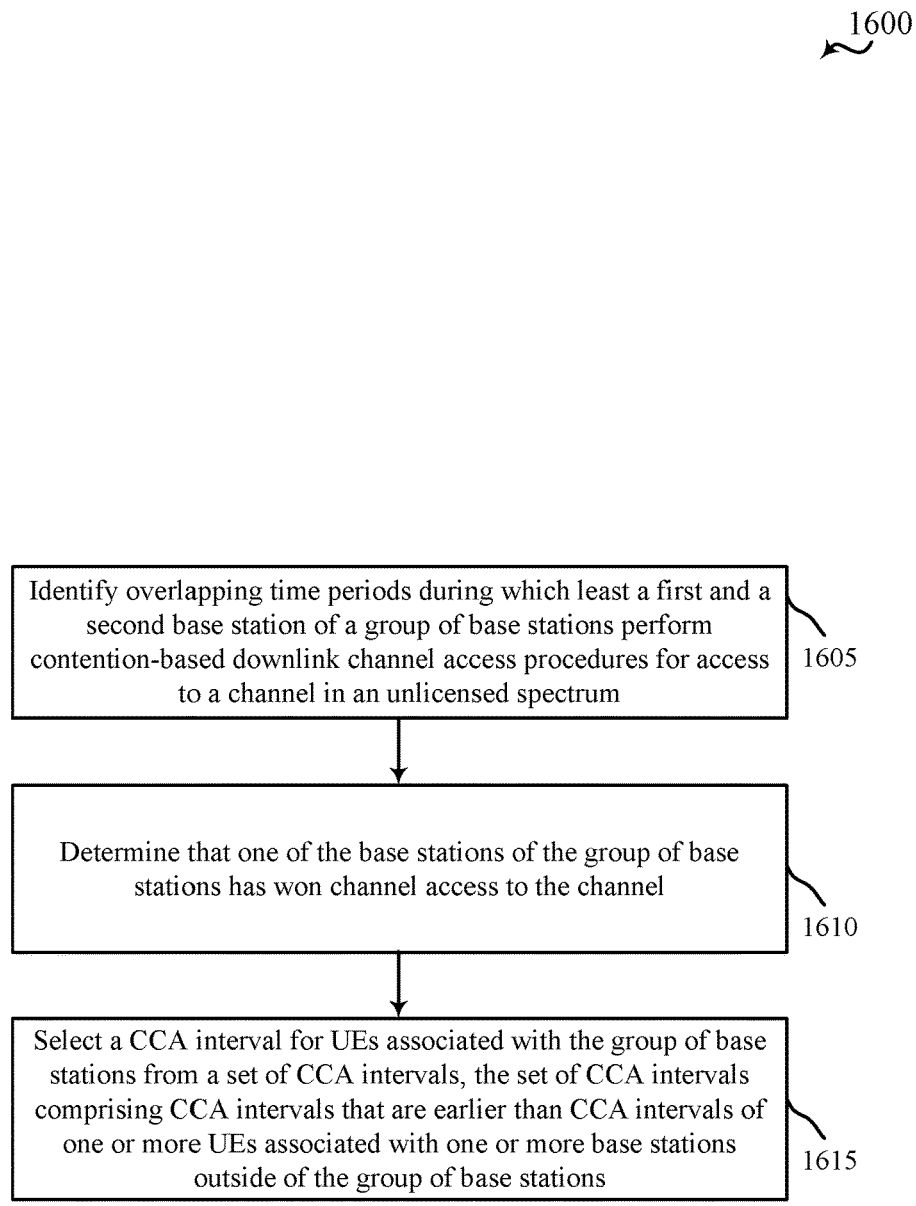
FIG. 16 is a flowchart of another example of a method for wireless communications using unlicensed spectrum (e.g., at a UE) according to various embodiments.

FIG. 16 is a flowchart illustrating an example of a method 1600 for wireless communications. For clarity, the method 1600 is described below with reference to ones of the UEs or devices 115, 215, 315, 1005, 1055, 1215 and/or 1315 described with reference to FIGS. 1, 2, 3, 10A, 10B, 12, and/or 13. In one embodiment, a UE may execute one or more sets of codes to control the functional elements of the UE to perform the functions described below.

At block 1605, overlapping time periods are identified during which least a first and a second base station of a group of base stations perform contention-based downlink channel access procedures for access to a channel in an unlicensed spectrum. In some embodiments, the base stations may each have a group id, and a mapping function may determine a CCA interval during which two or more base stations with different group ids are to perform a CCA to attempt to obtain channel access. The operation(s) at block 1605 may in some cases be performed using the CCA modification module 1020 and/or 1060 described with reference to FIGS. 10A and/or 10B, CCA identification module 1065 described with reference to FIG. 10B, the UE shared spectrum module 1240 described with reference to FIG. 12, and/or the module or function 1381 described with reference to FIG. 13.

At block 1610, it is determined that one of the base stations of the group of base stations has won channel access to the channel. The operation(s) at block 1610 may in some cases be performed using the CCA modification module 1020 and/or 1060 described with reference to FIGS. 10A and/or 10B, the channel determination module 1075 described with reference to FIG. 10B, the UE shared spectrum module 1240 described with reference to FIG. 12, and/or the module or function 1381 described with reference to FIG. 13.

At block 1615, a CCA interval is selected for UEs associated with the group of base stations from a set of CCA intervals, the set of CCA intervals comprising CCA intervals that are earlier than CCA intervals of one or more UEs associated with one or more base stations outside of the group of base stations. The operation(s) at block 1615 may in some cases be performed using the CCA modification module 1020 and/or 1060 described with reference to FIGS. 10A and/or 10B, the CCA adjustment module 1080 described with reference to FIG. 10B, the UE shared spectrum module 1240 described with reference to FIG. 12, and/or the module or function 1381 described with reference to FIG. 13.

Thus, the method 1600 may provide for wireless communications in which non-orthogonal CCA operations may be modified to be performed at different times for a UE based on whether a base station from a group of base stations performing a CCA during a CCA interval has gained channel access to a wireless communication channel in an unlicensed spectrum. It should be noted that the method 1600 is just one implementation and that the operations of the method 1600 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
   identifying, by a first user equipment (UE) associated with a first base station, a time period during which at least the first base station and a second base station perform a contention-based downlink channel access procedure for access to a channel in an unlicensed spectrum;
   determining that the first base station has won downlink channel access; and
   modifying a contention-based uplink channel access procedure for the first UE associated with the first base station by modifying a mapping function for determining clear channel assessment (CCA) intervals of a plurality of UEs including the first UE to favor the first UE gaining access to the channel in the unlicensed spectrum, the modifying the mapping function being based at least in part on the determining that the first base station has won downlink channel access.

2. The method of claim 1, further comprising:
   adjusting a time duration of a CCA to be performed by the first UE based at least in part on the determining that the first base station has won downlink channel access.

3. The method of claim 2, wherein the time duration of the CCA to be performed by the first UE is different from a time duration of a CCA by the first base station for performing the contention-based downlink channel access procedures.

4. The method of claim 1, wherein the modifying the mapping function comprises:
   modifying the mapping function for determining CCA intervals of the plurality of UEs including the first UE based at least in part on an identifier of the first base station that causes the mapping function to adjust change a time for performing a CCA by the first UE.

5. The method of claim 1, wherein the modifying the mapping function comprises:
   modifying the mapping function for determining CCA intervals of the plurality of UEs including the first UE and a second UE associated with the second base station based at least in part on an identifier of the first base station and an identifier of the second base station that causes the mapping function to change a time for performing a CCA by the first UE and a time for performing a CCA by the second UE.

6. The method of claim 5, wherein the identifier of the first base station in the mapping function is different from an identifier of the second base station.

7. The method of claim 1, wherein the modifying the mapping function comprises:
   modifying the mapping function to change a CCA interval of the first UE to be an earliest available CCA interval in a portion of a frame period for performing a contention-based uplink channel access procedure.

8. The method of claim 1, wherein the modifying the mapping function comprises:
   modifying the mapping function for determining CCA intervals of the plurality of UEs including the first UE such that a CCA interval for the first UE is swapped with a CCA interval for a second UE associated with the second base station.

9. The method of claim 1, wherein the wherein the modifying the mapping function comprises:
  determining a number of CCA intervals between a scheduled CCA interval for the first UE and an earliest available CCA interval in a portion of a frame period for performing a contention-based uplink channel access procedure; and
  shifting a scheduled CCA interval for a second UE by the determined number of CCA intervals.

10. The method of claim 1, wherein the wherein the modifying the mapping function comprises:
  assigning a scheduled CCA interval for the first UE to a scheduled CCA interval for a second UE when the second UE is scheduled to perform a CCA during an earliest available CCA interval in a portion of a frame period for performing a contention-based uplink channel access procedure.

11. The method of claim 1, wherein the modifying the mapping function comprises:
  modifying the mapping function to change a CCA interval of the first UE to be an earliest available CCA interval in a portion of a listen before talk (LBT) fixed frame period for performing a contention-based uplink channel access procedure.

12. The method of claim 11, wherein the LBT fixed frame period corresponds to a time division duplexing (TDD) frame structure.

13. The method of claim 1, wherein the determining that the first base station has won channel access comprises:
  monitoring a channel usage beacon signal (CUBS) of the base stations to determine that the first base station has won channel access.

14. The method of claim 1, wherein the time period during which the first base station and the second base station perform the downlink channel access procedure comprises CCA intervals, and wherein the CCA intervals of the first base station and the second base station are non-overlapping, and wherein the CCA intervals of the first base station and at least one other base station are overlapping.

15. The method of claim 14, wherein the CCA intervals associated with the downlink channel access procedure are determined based at least in part on a pseudo-random selection from available CCA intervals.

16. The method of claim 14, wherein the modifying the mapping function comprises:
  changing a time for performing a CCA by the first UE and at least one other UE associated with the at least one other base station.

17. The method of claim 1, further comprising:
  performing, by the first UE, a CCA in a CCA interval of the determined CCA intervals based at least in part on the modifying the mapping function.

18. An apparatus associated with a first user equipment (UE) for wireless communications, comprising:
  a processor;
  memory in electronic communication with the processor; and
  instructions stored in the memory, wherein the instructions are executable by the processor to:
    identify a time period during which at least the first base station and a second base station perform a contention-based downlink channel access procedure for access to a channel in an unlicensed spectrum;
    determine that the first base station has won downlink channel access; and
    modify a contention-based uplink channel access procedure for the first UE associated with the first base station by modifying a mapping function for determining clear channel assessment (CCA) intervals of a plurality of UEs including the first UE to favor the first UE gaining access to the channel in the unlicensed spectrum, wherein a modification of the mapping function is based at least in part on a determination that the first base station has won downlink channel access.

19. A non-transitory computer-readable medium storing code for wireless communication at a first user equipment (UE), the code comprising instructions executable to:
  identify a time period during which at least the first base station and a second base station perform a contention-based downlink channel access procedure for access to a channel in an unlicensed spectrum;
  determine that the first base station has won downlink channel access; and
  modify a contention-based uplink channel access procedure for the first UE associated with the first base station by modifying a mapping function for determining clear channel assessment (CCA) intervals of a plurality of UEs including the first UE to favor the first UE gaining access to the channel in the unlicensed spectrum, wherein a modification of the mapping function is based at least in part on a determination that the first base station has won downlink channel access.

* * * * *